US010698755B2

(12) United States Patent
Goldenberg et al.

(10) Patent No.: US 10,698,755 B2
(45) Date of Patent: **\*Jun. 30, 2020**

(54) ANALYSIS OF A SYSTEM FOR MATCHING DATA RECORDS

(71) Applicant: International Business Machines Corporation, Armonk, NY (US)

(72) Inventors: Glenn E. Goldenberg, Austin, TX (US); Scott Schumacher, Porter Ranch, CA (US); Jason Woods, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 14/290,030

(22) Filed: May 29, 2014

(65) Prior Publication Data

US 2014/0281729 A1  Sep. 18, 2014

Related U.S. Application Data

(63) Continuation of application No. 12/239,448, filed on Sep. 26, 2008, now Pat. No. 8,799,282.

(Continued)

(51) Int. Cl.
*G06F 11/07* (2006.01)
*G06F 16/2458* (2019.01)

(52) U.S. Cl.
CPC ........ *G06F 11/0769* (2013.01); *G06F 11/079* (2013.01); *G06F 16/2462* (2019.01)

(58) Field of Classification Search
CPC ......... G06F 17/30312; G06F 17/30327; G06F 2216/03; G06F 17/30011; G06F 17/30292;

(Continued)

(56) References Cited

U.S. PATENT DOCUMENTS 3,568,155 A * 3/1971 Abraham et al.
4,531,186 A    7/1985 Knapman
(Continued)

FOREIGN PATENT DOCUMENTS

JP   2000348042   12/2000
JP   2001236358    8/2001
(Continued)

OTHER PUBLICATIONS

Fair, "Record Linkage in the National Dose Registry of Canada", European Journal of Cancer, vol. 3, Supp. 3, pp. S37-S43, XP005058648 ISSN: 0959-8049, Apr. 1997.

(Continued)

*Primary Examiner* — David T. Brooks
*Assistant Examiner* — Berhanu Mitiku
(74) *Attorney, Agent, or Firm* — Reza Sarbakhsh; Edell, Shapiro & Finnan, LLC

(57) ABSTRACT

Embodiments disclosed herein provide a system and method for analyzing an identity hub. Particularly, a user can connect to the identity hub, load an initial set of data records, create and/or edit an identity hub configuration locally, analyze and/or validate the configuration via a set of analysis tools, including an entity analysis tool, a data analysis tool, a bucket analysis tool, and a linkage analysis tool, and remotely deploy the validated configuration to an identity hub instance. In some embodiments, through a graphical user interface, these analysis tools enable the user to analyze and modify the configuration of the identity hub in real time while the identity hub is operating to ensure data quality and enhance system performance.

19 Claims, 15 Drawing Sheets

Related U.S. Application Data

(60) Provisional application No. 60/997,038, filed on Sep. 28, 2007.

(58) Field of Classification Search
CPC ......... G06F 17/30598; G06F 17/30303; G06F 17/30371; G06F 17/30489; G06F 19/328; G16H 10/60
See application file for complete search history.

(56) References Cited

U.S. PATENT DOCUMENTS

| | | |
|---|---|---|
| 5,020,019 A | 5/1991 | Ogawa |
| 5,134,564 A | 7/1992 | Dunn et al. |
| 5,247,437 A | 9/1993 | Vale et al. |
| 5,321,833 A | 6/1994 | Chang et al. |
| 5,323,311 A | 6/1994 | Fukao et al. |
| 5,333,317 A | 7/1994 | Dann |
| 5,381,332 A | 1/1995 | Wood |
| 5,442,782 A | 8/1995 | Malatesta et al. |
| 5,497,486 A | 3/1996 | Stolfo et al. |
| 5,535,322 A | 7/1996 | Hecht |
| 5,535,382 A | 7/1996 | Ogawa |
| 5,537,590 A | 7/1996 | Amado |
| 5,555,409 A | 9/1996 | Leenstra et al. |
| 5,561,794 A | 10/1996 | Fortier |
| 5,583,763 A | 12/1996 | Atcheson et al. |
| 5,600,835 A | 2/1997 | Garland et al. |
| 5,606,690 A | 2/1997 | Hunter et al. |
| 5,615,367 A | 3/1997 | Bennett et al. |
| 5,640,553 A | 6/1997 | Schultz |
| 5,651,108 A | 7/1997 | Cain et al. |
| 5,675,752 A | 10/1997 | Scott et al. |
| 5,675,753 A | 10/1997 | Hansen et al. |
| 5,694,593 A | 12/1997 | Baclawski |
| 5,694,594 A | 12/1997 | Chang |
| 5,710,916 A | 1/1998 | Barbara et al. |
| 5,734,907 A | 3/1998 | Jarossay et al. |
| 5,765,150 A | 6/1998 | Burrows |
| 5,774,661 A | 6/1998 | Chatterjee |
| 5,774,883 A | 6/1998 | Anderson |
| 5,774,887 A | 6/1998 | Wolff et al. |
| 5,778,370 A | 7/1998 | Emerson |
| 5,787,431 A | 7/1998 | Shaughnessy |
| 5,787,470 A | 7/1998 | DeSimone et al. |
| 5,790,173 A | 8/1998 | Strauss |
| 5,796,393 A | 8/1998 | MacNaughton et al. |
| 5,805,702 A | 9/1998 | Curry |
| 5,809,499 A | 9/1998 | Wong et al. |
| 5,819,264 A | 10/1998 | Palmon et al. |
| 5,835,712 A | 11/1998 | DuFresne |
| 5,835,912 A | 11/1998 | Pet |
| 5,848,271 A | 12/1998 | Caruso et al. |
| 5,859,972 A | 1/1999 | Subramaniam et al. |
| 5,862,322 A | 1/1999 | Anglin et al. |
| 5,862,325 A | 1/1999 | Reed et al. |
| 5,878,043 A | 3/1999 | Casey |
| 5,893,074 A | 4/1999 | Hughes et al. |
| 5,893,110 A | 4/1999 | Weber et al. |
| 5,905,496 A | 5/1999 | Lau et al. |
| 5,930,768 A | 7/1999 | Hooban |
| 5,960,411 A | 9/1999 | Hartman et al. |
| 5,963,915 A | 10/1999 | Kirsch |
| 5,987,422 A | 11/1999 | Buzsaki |
| 5,991,758 A | 11/1999 | Ellard |
| 5,999,937 A | 12/1999 | Ellard |
| 6,014,664 A | 1/2000 | Fagin et al. |
| 6,016,489 A | 1/2000 | Cavanaugh et al. |
| 6,018,733 A | 1/2000 | Kirsch et al. |
| 6,018,742 A | 1/2000 | Herbert, III |
| 6,026,433 A | 2/2000 | D'Arlach et al. |
| 6,049,847 A | 4/2000 | Vogt et al. |
| 6,067,549 A | 5/2000 | Smalley et al. |
| 6,069,628 A | 5/2000 | Fairy et al. |
| 6,078,325 A | 6/2000 | Jolissaint et al. |
| 6,108,004 A | 8/2000 | Medl |
| 6,134,581 A | 10/2000 | Ismael et al. |
| 6,185,608 B1 | 2/2001 | Hon et al. |
| 6,223,145 B1 | 4/2001 | Hearst |
| 6,269,373 B1 | 7/2001 | Apte et al. |
| 6,297,824 B1 | 10/2001 | Hearst et al. |
| 6,298,478 B1 | 10/2001 | Nally et al. |
| 6,311,190 B1 | 10/2001 | Bayer et al. |
| 6,327,611 B1 | 12/2001 | Everingham |
| 6,330,569 B1 | 12/2001 | Baisley et al. |
| 6,349,325 B1 | 2/2002 | Newcombe et al. |
| 6,356,931 B2 | 3/2002 | Ismael et al. |
| 6,374,241 B1 | 4/2002 | Lamburt et al. |
| 6,385,600 B1 | 5/2002 | McGuinness et al. |
| 6,389,429 B1 | 5/2002 | Kane et al. |
| 6,446,188 B1 | 9/2002 | Henderson et al. |
| 6,449,620 B1 | 9/2002 | Draper |
| 6,457,065 B1 | 9/2002 | Rich et al. |
| 6,460,045 B1 * | 10/2002 | Aboulnaga et al. |
| 6,496,793 B1 | 12/2002 | Veditz et al. |
| 6,502,099 B1 | 12/2002 | Rampy et al. |
| 6,510,505 B1 | 1/2003 | Burns et al. |
| 6,523,019 B1 | 2/2003 | Borthwick |
| 6,529,888 B1 | 3/2003 | Heckerman et al. |
| 6,556,983 B1 | 4/2003 | Altschuler et al. |
| 6,557,100 B1 | 4/2003 | Knutson |
| 6,621,505 B1 | 9/2003 | Beauchamp et al. |
| 6,633,878 B1 | 10/2003 | Underwood |
| 6,633,882 B1 | 10/2003 | Fayyad et al. |
| 6,633,992 B1 | 10/2003 | Fayyad et al. |
| 6,647,383 B1 | 11/2003 | August et al. |
| 6,662,180 B1 | 12/2003 | Aref et al. |
| 6,687,702 B2 | 2/2004 | Vaitheeswaran et al. |
| 6,704,805 B1 | 3/2004 | Acker et al. |
| 6,718,535 B1 | 4/2004 | Underwood |
| 6,742,003 B2 | 5/2004 | Heckerman et al. |
| 6,757,708 B1 | 6/2004 | Craig et al. |
| 6,795,793 B2 | 9/2004 | Shayegan et al. |
| 6,807,537 B1 | 10/2004 | Thiesson et al. |
| 6,842,761 B2 | 1/2005 | Diamond et al. |
| 6,842,906 B1 | 1/2005 | Bowman-Amuah |
| 6,879,944 B1 | 4/2005 | Tipping et al. |
| 6,907,422 B1 | 6/2005 | Predovic |
| 6,912,549 B2 | 6/2005 | Rotter et al. |
| 6,922,695 B2 | 7/2005 | Skufca et al. |
| 6,957,186 B1 | 10/2005 | Guheen et al. |
| 6,990,636 B2 | 1/2006 | Beauchamp et al. |
| 6,996,565 B2 | 2/2006 | Skufca et al. |
| 7,035,809 B2 | 4/2006 | Miller et al. |
| 7,043,476 B2 | 5/2006 | Robson |
| 7,099,857 B2 | 8/2006 | Lambert |
| 7,143,091 B2 | 11/2006 | Charnock et al. |
| 7,155,427 B1 | 12/2006 | Prothia |
| 7,181,459 B2 | 2/2007 | Grant et al. |
| 7,249,131 B2 | 7/2007 | Skufca et al. |
| 7,330,845 B2 | 2/2008 | Lee et al. |
| 7,487,173 B2 | 2/2009 | Medicke et al. |
| 7,526,486 B2 | 4/2009 | Cushman, II et al. |
| 7,558,737 B2 | 7/2009 | Sudhi |
| 7,567,962 B2 | 7/2009 | Chakrabarti et al. |
| 7,620,647 B2 | 11/2009 | Stephens et al. |
| 7,627,550 B1 | 12/2009 | Adams et al. |
| 7,685,093 B1 | 3/2010 | Adams et al. |
| 7,698,268 B1 | 4/2010 | Adams et al. |
| 7,788,274 B1 | 8/2010 | Ionescu |
| 8,321,383 B2 | 11/2012 | Schumacher et al. |
| 8,321,393 B2 | 11/2012 | Adams et al. |
| 8,332,366 B2 | 12/2012 | Schumacher et al. |
| 8,356,009 B2 | 1/2013 | Ellard et al. |
| 8,359,339 B2 | 1/2013 | Adams et al. |
| 8,370,355 B2 | 2/2013 | Harger et al. |
| 8,370,366 B2 | 2/2013 | Adams et al. |
| 8,417,702 B2 | 4/2013 | Harger et al. |
| 8,423,514 B2 | 4/2013 | Goldenberg et al. |
| 8,429,220 B2 | 4/2013 | Wilkinson et al. |
| 8,510,338 B2 | 8/2013 | Cushman, II et al. |
| 8,515,926 B2 | 8/2013 | Goldenberg et al. |
| 8,589,415 B2 | 11/2013 | Adams et al. |
| 8,713,434 B2 | 4/2014 | Ford et al. |

(56) References Cited

U.S. PATENT DOCUMENTS

| | | |
|---|---|---|
| 9,286,374 B2 | 3/2016 | Ford et al. |
| 9,600,563 B2 | 3/2017 | Ford et al. |
| 2002/0007284 A1 | 1/2002 | Schurenberg et al. |
| 2002/0073099 A1 | 6/2002 | Gilbert et al. |
| 2002/0080187 A1 | 6/2002 | Lawton |
| 2002/0087599 A1 | 7/2002 | Grant et al. |
| 2002/0095421 A1 | 7/2002 | Koskas |
| 2002/0099694 A1 | 7/2002 | Diamond et al. |
| 2002/0152422 A1 | 10/2002 | Sharma et al. |
| 2002/0156917 A1 | 10/2002 | Nye |
| 2002/0169647 A1 | 11/2002 | Newbold |
| 2002/0178360 A1 | 11/2002 | Wenocur et al. |
| 2002/0198896 A1* | 12/2002 | Chaudhuri .......... G06F 16/2462 |
| 2003/0004770 A1 | 1/2003 | Miller et al. |
| 2003/0004771 A1 | 1/2003 | Yaung |
| 2003/0018652 A1 | 1/2003 | Heckerman et al. |
| 2003/0023773 A1 | 1/2003 | Lee et al. |
| 2003/0051063 A1 | 3/2003 | Skufca et al. |
| 2003/0065826 A1 | 4/2003 | Skufca et al. |
| 2003/0065827 A1 | 4/2003 | Skufca et al. |
| 2003/0105825 A1 | 6/2003 | Kring et al. |
| 2003/0120630 A1 | 6/2003 | Tunkelang |
| 2003/0145002 A1 | 7/2003 | Kleinberger et al. |
| 2003/0149631 A1* | 8/2003 | Crampton ............ G06Q 20/203 705/22 |
| 2003/0158850 A1 | 8/2003 | Lawrence et al. |
| 2003/0174179 A1 | 9/2003 | Suermondt et al. |
| 2003/0182101 A1 | 9/2003 | Lambert |
| 2003/0195836 A1 | 10/2003 | Hayes et al. |
| 2003/0195889 A1 | 10/2003 | Yao et al. |
| 2003/0195890 A1 | 10/2003 | Oommen |
| 2003/0220858 A1 | 11/2003 | Lam et al. |
| 2003/0227487 A1 | 12/2003 | Hugh |
| 2004/0006500 A1 | 1/2004 | Guicciardi |
| 2004/0107189 A1 | 6/2004 | Burdick et al. |
| 2004/0107205 A1* | 6/2004 | Burdick ................ G06F 16/215 |
| 2004/0122790 A1 | 6/2004 | Walker et al. |
| 2004/0143477 A1 | 7/2004 | Wolff |
| 2004/0143508 A1 | 7/2004 | Bohn et al. |
| 2004/0181526 A1 | 9/2004 | Burdick et al. |
| 2004/0181554 A1 | 9/2004 | Heckerman et al. |
| 2004/0220926 A1 | 11/2004 | Lamkin et al. |
| 2004/0260694 A1 | 12/2004 | Chaudhuri et al. |
| 2005/0004895 A1 | 1/2005 | Schurenberg et al. |
| 2005/0015381 A1 | 1/2005 | Clifford et al. |
| 2005/0015675 A1 | 1/2005 | Kolawa et al. |
| 2005/0050068 A1 | 3/2005 | Vaschillo et al. |
| 2005/0055345 A1 | 3/2005 | Ripley |
| 2005/0060286 A1 | 3/2005 | Hansen et al. |
| 2005/0071194 A1 | 3/2005 | Bormann et al. |
| 2005/0075917 A1 | 4/2005 | Flores et al. |
| 2005/0114369 A1 | 5/2005 | Gould et al. |
| 2005/0149522 A1 | 7/2005 | Cookson et al. |
| 2005/0154615 A1 | 7/2005 | Rotter et al. |
| 2005/0210007 A1 | 9/2005 | Beres et al. |
| 2005/0228808 A1 | 10/2005 | Mamou et al. |
| 2005/0240392 A1 | 10/2005 | Munro et al. |
| 2005/0256740 A1 | 11/2005 | Kohan et al. |
| 2005/0256882 A1 | 11/2005 | Able et al. |
| 2005/0273452 A1 | 12/2005 | Molloy et al. |
| 2006/0041447 A1 | 2/2006 | Vucina et al. |
| 2006/0044307 A1 | 3/2006 | Song |
| 2006/0053151 A1 | 3/2006 | Gardner et al. |
| 2006/0053172 A1 | 3/2006 | Gardner et al. |
| 2006/0053173 A1 | 3/2006 | Gardner et al. |
| 2006/0053382 A1 | 3/2006 | Gardner et al. |
| 2006/0064429 A1 | 3/2006 | Yao |
| 2006/0074832 A1 | 4/2006 | Gardner et al. |
| 2006/0074836 A1 | 4/2006 | Gardner et al. |
| 2006/0080312 A1 | 4/2006 | Friedlander et al. |
| 2006/0116983 A1 | 6/2006 | Dettinger et al. |
| 2006/0117032 A1 | 6/2006 | Dettinger et al. |
| 2006/0129605 A1 | 6/2006 | Doshi |
| 2006/0129971 A1 | 6/2006 | Rojer |
| 2006/0136205 A1 | 6/2006 | Song |
| 2006/0161522 A1 | 7/2006 | Dettinger et al. |
| 2006/0167896 A1 | 7/2006 | Kapur et al. |
| 2006/0179050 A1 | 8/2006 | Giang et al. |
| 2006/0190445 A1 | 8/2006 | Risberg et al. |
| 2006/0195460 A1 | 8/2006 | Nori et al. |
| 2006/0195560 A1 | 8/2006 | Newport |
| 2006/0265400 A1 | 11/2006 | Fain et al. |
| 2006/0271401 A1 | 11/2006 | Lassetter et al. |
| 2006/0271549 A1 | 11/2006 | Rayback et al. |
| 2006/0287890 A1 | 12/2006 | Stead et al. |
| 2007/0005567 A1 | 1/2007 | Hermansen et al. |
| 2007/0016450 A1 | 1/2007 | Bhora et al. |
| 2007/0055647 A1 | 3/2007 | Mullins et al. |
| 2007/0067285 A1 | 3/2007 | Blume et al. |
| 2007/0073678 A1 | 3/2007 | Scott et al. |
| 2007/0073745 A1 | 3/2007 | Scott et al. |
| 2007/0094060 A1 | 4/2007 | Apps et al. |
| 2007/0150279 A1 | 6/2007 | Gandhi et al. |
| 2007/0168135 A1* | 7/2007 | Agarwal ................ G06F 19/18 702/19 |
| 2007/0192715 A1 | 8/2007 | Kataria et al. |
| 2007/0198481 A1 | 8/2007 | Hogue et al. |
| 2007/0198598 A1* | 8/2007 | Betz ................ G06F 17/30533 |
| 2007/0198600 A1 | 8/2007 | Betz |
| 2007/0214129 A1 | 9/2007 | Ture et al. |
| 2007/0214179 A1 | 9/2007 | Hoang |
| 2007/0217676 A1 | 9/2007 | Grauman et al. |
| 2007/0250487 A1 | 10/2007 | Reuther |
| 2007/0260492 A1 | 11/2007 | Feied et al. |
| 2007/0276844 A1 | 11/2007 | Segal et al. |
| 2007/0276858 A1 | 11/2007 | Cushman et al. |
| 2007/0299697 A1 | 12/2007 | Friedlander et al. |
| 2007/0299842 A1 | 12/2007 | Morris et al. |
| 2008/0005106 A1 | 1/2008 | Schumacher et al. |
| 2008/0016218 A1 | 1/2008 | Jones et al. |
| 2008/0069132 A1 | 3/2008 | Ellard et al. |
| 2008/0120432 A1 | 5/2008 | Lamoureaux et al. |
| 2008/0126160 A1 | 5/2008 | Takuechi et al. |
| 2008/0127041 A1 | 5/2008 | Gura |
| 2008/0201713 A1 | 8/2008 | Chaffee et al. |
| 2008/0243832 A1 | 10/2008 | Adams et al. |
| 2008/0243885 A1 | 10/2008 | Harger et al. |
| 2008/0244008 A1* | 10/2008 | Wilkinson et al. ........... 709/205 |
| 2008/0276221 A1 | 11/2008 | Lev et al. |
| 2009/0089317 A1 | 4/2009 | Ford et al. |
| 2009/0089332 A1 | 4/2009 | Harger et al. |
| 2009/0089630 A1 | 4/2009 | Goldenberg et al. |
| 2009/0198686 A1 | 8/2009 | Cushman, II et al. |
| 2010/0114877 A1 | 5/2010 | Adams et al. |
| 2010/0174725 A1 | 7/2010 | Adams et al. |
| 2010/0175024 A1 | 7/2010 | Schumacher et al. |
| 2011/0010214 A1 | 1/2011 | Carruth |
| 2011/0010346 A1 | 1/2011 | Goldenberg et al. |
| 2011/0010401 A1 | 1/2011 | Adams et al. |
| 2011/0010728 A1 | 1/2011 | Goldenberg et al. |
| 2011/0047044 A1 | 2/2011 | Wright et al. |
| 2011/0191349 A1 | 8/2011 | Ford et al. |
| 2013/0204880 A1 | 8/2013 | Lesiecki et al. |
| 2014/0280274 A1 | 9/2014 | Louis et al. |
| 2014/0281729 A1 | 9/2014 | Goldenberg et al. |
| 2015/0254308 A1 | 9/2015 | Scott et al. |
| 2016/0147869 A1 | 5/2016 | Ford et al. |

FOREIGN PATENT DOCUMENTS

| | | |
|---|---|---|
| JP | 2005063332 | 3/2005 |
| JP | 2006163941 | 6/2006 |
| JP | 2006277413 | 10/2006 |
| WO | 9855947 A1 | 12/1998 |
| WO | 0159586 | 8/2001 |
| WO | 0159586 A2 | 8/2001 |
| WO | 0175679 A1 | 10/2001 |
| WO | 03021485 | 3/2003 |
| WO | 2004023297 A1 | 3/2004 |
| WO | 2004023311 A1 | 3/2004 |
| WO | 2004023345 A1 | 3/2004 |

(56) References Cited

FOREIGN PATENT DOCUMENTS

| | | |
|---|---|---|
| WO | 2009042931 A1 | 4/2009 |
| WO | 2009042941 A1 | 4/2009 |

OTHER PUBLICATIONS

International Search Report and Written Opinion, for PCT/US2007/012073, dated Jul. 23, 2008, 12 pages.
International Preliminary Report on Patentability Issued in PCT/US2007/013049, dated Dec. 17, 2008, 3 pages.
International Search Report and Written Opinion issued in PCT/US2007/013049, dated Jun. 13, 2008, 10 pages.
Office Action issued in U.S. Appl. No. 11/809,792, dated Aug. 21, 2009, 14 pages.
Oracle Data Hubs: "The Emperor Has No Clothes?", Feb. 21, 2005, Google.com, pp. 1-9.
IEEE, no matched results , Jun. 30, 2009, p. 1.
IEEE No matched Results, 1 Page, Sep. 11, 2009.
Office Action issued in U.S. Appl. No. 11/522,223 dated Aug. 20, 2008, 16 pgs.
Office Action issued in U.S. Appl. No. 11/522,223 dated Feb. 5, 2009, Adams, 17 pages.
Notice of Allowance issued for U.S. Appl. No. 11/522,223, dated Sep. 17, 2009, 20 pages.
De Rose, et al. "Building Structured Web Community Portals: A Top-Down, Compositional, and Incremental Approach", VDLB, ACM, pp. 399-410, Sep. 2007.
Microsoft Dictionary, "normalize", at p. 20, Fifth Edition, Microsoft Corp., downloaded from http://proquest.safaribooksonline.com/0735614954 on Sep. 8, 2008.
Office Action issued in U.S. Appl. No. 11/521,928 dated Apr. 1, 2009, 22 pages.
Office Action issued in U.S. Appl. No. 11/521,928 dated Sep. 16, 2008, 14 pages.
Notice of Allowance issued for U.S. Appl. No. 11/521,928, dated Sep. 18, 2009, 20 pages.
Gopalan Suresh Raj, Modeling Using Session and Entity Beans, Dec. 1998, Web Cornucopia, pp. 1-15.
Scott W. Ambler, Overcoming Data Design Challenges, Aug. 2001, p. 1-3.
XML, JAVA, and the future of the Web, Bosak, J., Sun Microsystems, Mar. 10, 1997, pp. 1-9.
Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115, 1995.
International Search Report dated Jul. 19, 2006, for PCT/IL2005/000784 (6 pages).
Hamming Distance, HTML. Wikipedia.org, Available: http://en.wikipedia.org/wiki/Hamming_distance (as of May 8, 2008), 1 page.
Office Action Issued in U.S. Appl. No. 11/521,946 dated May 14, 2008, 10 pgs.
Office Action issued in U.S. Appl. No. 11/521,946 dated Dec. 9, 2008, 10 pgs.
Office Action issued in U.S. Appl. No. 11/521,946 dated May 13, 2009, 12 pgs.
Freund et al., Statistical Methods, 1993, Academic Press Inc., United Kingdom Edition, pp. 112-117.
Merriam-Webster dictionary defines "member" as "individuals", 2008, Meriam Webster, Inc., 2 pages.
Waddington, D., "Does it signal convergence of operational and analytic MDM?" retrieved from the internet:<URL: http://www.intelligententerprise.com>, 2 pages, Aug. 2006.
International Search Report dated Oct. 10, 2008, for PCT Application No. PCT/US07/20311 (10 pp).
International Search Report and Written Opinion issued in PCT/US07/89211, dated Jun. 20, 2008, 8 pages.
International Search Report and Written Opinion for PCT/US08/58404, dated Aug. 15, 2008, 7 pages.

International Preliminary Report on Patentability Under Chapter 1 for PCT Application No. PCT/US2008/058665, dated Sep. 29, 2009, mailed Oct. 8, 2009, 6 pgs.
International Search Report and Written Opinion dated Dec. 3, 2008 for International Patent Application No. PCT/US2008/077985, 8 pages.
Gu, Lifang, et al., "Record Linkage: Current Practice and Future Directions," CSIRO Mathematical and Informational Sciences, 2003, pp. 1-32.
O'Hara-Schettino, et al., "Dynamic Navigation in Multiple View Software Specifications and Designs," Journal of Systems and Software, vol. 41, Issue 2, May 1998, pp. 93-103.
International Search Report and Written Opinion dated Oct. 10, 2008 for PCT Application No. PCT/US08/68979.
International Search Report and Written Opinion dated Dec. 2, 2008 for PCT/US2008/077970, 7 pages.
Martha E. Fair, et al., "Tutorial on Record Linkage Slides Presentation", Chapter 12, pp. 457-479, Apr. 1997.
International Search Report and Written Opinion dated Aug. 28, 2008 for Application No. PCT/US2008/58665, 7 pgs.
C.C. Gotlieb, Oral Interviews with C.C. Gotlieb, Apr. 1992, May 1992, ACM, pp. 1-72.
Google.com, no match results, Jun. 30, 2009, p. 1.
Supplementary European Search Report for EP 07 79 5659 dated May 18, 2010, 5 pages.
European Communication for EP 98928878 (PCT/US9811438) dated Feb. 16, 2006, 5 pages.
European Communication for EP 98928878 (PCT/US9811438) dated Mar. 10, 2008, 4 pages.
European Communication for EP 98928878 (PCT/US9811438) dated Jun. 26, 2006, 4 pages.
Gill, "OX-LINK: The Oxford Medical Record Linkage System", Internet Citation, 1997, pp. 15-33.
Newcombe et al., "The Use of Names for Linking Personal Records", Journal of the American Statistical Association, vol. 87, Dec. 1, 1992, pp. 335-349.
European Communication for EP 07795659 (PCT/US2007013049) dated May 27, 2010, 6 pages.
Ohgaya, Ryosuke et al., "Conceptual Fuzzy Sets-, NAFIPS 2002, Jun. 27-29, 2002, pp. 274-279.Based Navigation System for Yahoo!".
Xue, Gui-Rong et al., "Reinforcing Web-Object Categorization Through Interrelationships", Data Mining and Knowledge Discover, vol. 12, Apr. 4, 2006, pp. 229-248.
Jason Woods, et al., "Baja Identity Hub Configuration Process", Publicly available on Apr. 2, 2009, Version 1.3., 12 pages.
Initiate Systems, Inc. "Refining the Auto-Link Threshold Based Upon Scored Sample", Publicly available on Apr. 2, 2009; memorandum, 18 pages.
Initiate Systems, Inc. "Introduction", "False-Positive Rate (Auto-Link Threshold)", Publicly available on Apr. 2, 2009; memorandum, 3 pages.
Jason Woods, "Workbench 8.0 Bucket Analysis Tools", Publicly available on Apr. 2, 2009, 42 pages.
"Parsing" Publicly available on Oct. 2, 2008, 6 pages.
Initiate, "Business Scenario: Multi-Lingual Algorithm and Hub," Publicly available on Apr. 2, 2009, 2 pages.
Initiate, "Business Scenario: Multi-Lingual & Many-To-Many Entity Solutions", Publicly available on Apr. 2, 2009, 16 pages.
Initiate, "Relationships—MLH", presentation; Publicly available on Sep. 28, 2007, 9 pages.
Initiate, "Multi-Lingual Hub Support viaMemtype Expansion", Publicly available on Apr. 2, 2009, 4 pages.
Initiate Systems, Inc. "Multi-Language Hubs", memorandum; Publicly available on Apr. 2, 2009, 2 pages.
Initiate, "Business Scenario: Support for Members in Multiple Entities", Publicly available on Oct. 2, 2008, 2 pages.
Initiate, "Group Entities", Publicly available on Mar. 30, 2007, 20 pages.
Jim Cushman, MIO 0.5: MIO As a Source; Initiate; Publicly available on Oct. 2, 2008, 14 pages.
Initiate, "Provider Registry Functionality", Publicly available on Oct. 2, 2008, 4 pages.

(56) References Cited

OTHER PUBLICATIONS

Edward Seabolt, "Requirement Specification Feature #NNNN Multiple Entity Relationship", Version 0.1—Draft; Publicly available on Oct. 2, 2008, 4 pages.
Initiate, "Arriba Training Engine Callouts", presentation; Publicly available on Mar. 30, 2007, 16 pages.
Initiate, "Business Scenario: Callout to Third Party System", Publicly available on Oct. 2, 2008, 4 pages.
John Dorney, "Requirement Specification Feature #NNNN Conditional Governance", Version 1.0—Draft; Publicly available on Oct. 2, 2008, 15 pages.
Initiate, Release Content Specification, Identity Hub Release 6.1, RCS Version 1.0; Publicly available on Sep. 16, 2005, 38 pages.
Initiate, "Initiate Identity Hub™ Manager User Manual", Release 6.1; Publicly available on Sep. 16, 2005, 159 pages.
End User Training CMT; CIO Maintenance Tool (CMT) Training Doc; Publicly available on Sep. 29, 2006, 17 pages.
"Hierarchy Viewer—OGT 3.0t", Publicly available on Sep. 25, 2008, 4 pages.
"Building and Searching the OGT", Publicly available on Sep. 29, 2006, 22 pages.
Sean Stephens, "Requirement Specification B2B Web Client Architecture", Version 0.1—Draft; Publicly available on Sep. 25, 2008, 16 pages.
"As of: OGT 2.0", Publicly available on Sep. 29, 2006, 23 pages.
Initiate, "Java SDK Self-Training Guide", Release 7.0; Publicly available on Mar. 24, 2006, 141 pages.
Initiate, "Memtype Expansion Detailed Design", Publicly available on Apr. 2, 2009, 3 pages.
Adami, Giordano et al., "Clustering Documents in a Web Directory", WIDM '03, New Orleans, LA, Nov. 7-8, 2003, pp. 66-73.
Chen, Hao et al., "Bringing Order to the Web: Automatically Categorizing Search Results", CHI 2000, CHI Letters, vol. 2, Issue 1, Apr. 1-6, 2000, pp. 145-152.
"Implementation Defined Segments—Exhibit A", Publicly available on Mar. 20, 2008, 13 pages.
Initiate, "Implementation Defined Segments—Gap Analysis", Publicly available on Mar. 20, 2008, 2 pages.
"Supporting Hierarchies", Publicly available on Nov. 29, 2007, 6 pages.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
International Preliminary Report on Patentability, PCT/US2008/58404, dated Mar. 21, 2011, 4 pages.
European Search Report/EP07795659.7, dated Apr. 15, 2011, 7 pages.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Preliminary Report on Patentability, PCT/US2007/89211, dated Apr. 30, 2012, 6 pages.
European Search Report/EP07795108.5, dated May 29, 2012, 6 pages.
Chinese Office Action and Translation, App. No. 200880117086.9, dated Jul. 3, 2013, 10 pages.
European Search Report/EP08833215.0, dated Jul. 25, 2013, 7 pages.
Elfeky et al., "TAILOR: A Record Linkage Toolbox", IEEE Comp. Soc., vol. Conf. 18, Feb. 26, 2002, pp. 17-28.
Baxter et al., "A Comparison of Fast Blocking Methods for Record Linkage", 2003, pp. 1-6.
Bilenko et al., "Adaptive Blocking: Learning to Scale Up Record Linkage", ICDM '06, Dec. 1, 2006, pp. 87-96.

\* cited by examiner

80a

```
Job Configuration (Generate Weights)
Entity Type: [id  ▼] ~84
┌Steps┐ Inputs and Outputs │ Performance Tuning │ Options │ Log Options
Select the weight generation step to run and indicate whether to run subsequent steps
through the end of the process.
 ┌─Weight generation steps ─────────────────────────────────────┐
 │ ⊙ Delete artifacts from previous run                          │
 │ ○ Generate counts for all attribute values                    │
 │ ○ Generate random pairs of members                            │
 │ ○ Derive random data by comparing random members              │
 │ ○ Perform matched candidate pairs reduction                   │
 │ ○ Generate matched set, matched statistics, and initial weights│
 │    ☐ Skip last step because of too few attributes             │
 │ ○ Iterate over previous step and check for convergence of weights│
 └─────────────────────────────────────────────────────────────┘
 ☑ Execute all remaining steps through end of process
```

```
Job Configuration (Threshold Analysis Pair Generation)
Entity Type:              [id       ▼]~84
Input Directory:          [bxm         ]
Output File:              [samplePairs.xls]
Number of pairs per score: [10        ⇕]
☐ Include only cross
   source pairs          CLERICAL REVIEW THRESHOLD
┌─Score Range──────────⌐86  ┌─Result Order──────────┐
│ Minimum Score: [8.0  ⇕]   │ ⊙ Sorted by score     │
│ Maximum Score: [25.0 ⇕]   │ ○ Random              │
└───────────────────┘       └───────────────────────┘
                      ~88
                AUTOLINK THRESHOLD
┌Attributes to Return┐ Source Filter
│ ⊞─☐ APPT                                         │
│ ⊞─☑ Birth Date                                   │
└──────────────────────────────────────────────────┘
```

ANALYSIS OF A SYSTEM FOR MATCHING DATA RECORDS

CROSS-REFERENCE TO RELATED APPLICATIONS

This application is a continuation of U.S. patent application Ser. No. 12/239,448, filed Sep. 26, 2008, entitled "ANALYSIS OF A SYSTEM FOR MATCHING DATA RECORDS", which claims priority from U.S. Provisional Application No. 60/997,038, filed Sep. 28, 2007, entitled "METHOD AND SYSTEM FOR ANALYSIS OF A SYSTEM FOR MATCHING DATA RECORDS," which are fully incorporated herein by reference. This application also relates to U.S. patent application Ser. No. 12/056,720, filed Mar. 27, 2008, entitled "METHOD AND SYSTEM FOR MANAGING ENTITIES," Ser. No. 11/967,588, filed Dec. 31, 2007, entitled "METHOD AND SYSTEM FOR PARSING LANGUAGES," Ser. No. 11/904,750, filed Sep. 28, 2007, entitled "METHOD AND SYSTEM FOR INDEXING, RELATING AND MANAGING INFORMATION ABOUT ENTITIES," Ser. No. 11/901,040, filed Sep. 14, 2007, entitled "HIERARCHY GLOBAL MANAGEMENT SYSTEM AND USER INTERFACE," Ser. No. 11/900,769, filed Sep. 13, 2007, entitled "IMPLEMENTATION DEFINED SEGMENTS FOR RELATIONAL DATABASE SYSTEMS," Ser. No. 11/824,210, filed Jun. 29, 2007, entitled "METHOD AND SYSTEM FOR PROJECT MANAGEMENT," Ser. No. 11/809,792, filed Jun. 1, 2007, entitled "SYSTEM AND METHOD FOR AUTOMATIC WEIGHT GENERATION FOR PROBABILISTIC MATCHING," Ser. No. 11/702,410, filed Feb. 5, 2007, entitled "METHOD AND SYSTEM FOR A GRAPHICAL USER INTERFACE FOR CONFIGURATION OF AN ALGORITHM FOR THE MATCHING OF DATA RECORDS," Ser. No. 11/656,111, filed Jan. 22, 2007, entitled "METHOD AND SYSTEM FOR INDEXING INFORMATION ABOUT ENTITIES WITH RESPECT TO HIERARCHIES," Ser. No. 11/522,223, filed Sep. 15, 2006, entitled "METHOD AND SYSTEM FOR COMPARING ATTRIBUTES SUCH AS PERSONAL NAMES," and Ser. No. 11/521,928, filed Sep. 15, 2006, entitled "METHOD AND SYSTEM FOR COMPARING ATTRIBUTES SUCH AS BUSINESS NAMES." All applications referenced in this paragraph are fully incorporated herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to associating data records and, more particularly, to identifying data records that may contain information about the same entity such that these data records may be associated. Even more particularly, embodiments disclosed herein may relate to the analysis of a system for the identification and association of data records, including analysis related to the performance or configuration of such a system.

BACKGROUND

In today's day and age, the vast majority of businesses retain extensive amounts of data regarding various aspects of their operations, such as inventories, customers, products, etc. Data about entities, such as people, products, parts or anything else may be stored in digital format in a data store such as a computer database. These computer databases permit the data about an entity to be accessed rapidly and permit the data to be cross-referenced to other relevant pieces of data about the same entity. The databases also permit a person to query the database to find data records pertaining to a particular entity, such that data records from various data stores pertaining to the same entity may be associated with one another.

A data store, however, has several limitations which may limit the ability to find the correct data about an entity within the data store. The actual data within the data store is only as accurate as the person who entered the data, or an original data source. Thus, a mistake in the entry of the data into the data store may cause a search for data about an entity in the database to miss relevant data about the entity because, for example, a last name of a person was misspelled or a social security number was entered incorrectly, etc. A whole host of these types of problems may be imagined: two separate record for an entity that already has a record within the database may be created such that several data records may contain information about the same entity, but, for example, the names or identification numbers contained in the two data records may be different so that it may be difficult to associate the data records referring to the same entity with one other.

For a business that operates one or more data stores containing a large number of data records, the ability to locate relevant information about a particular entity within and among the respective databases is very important, but not easily obtained. Once again, any mistake in the entry of data (including without limitation the creation of more then one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records-relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed, and prevent the user from picking the wrong data record, it is also desirable to identify and associate data records from the various information sources that may contain information about the same entity. There are conventional systems that locate duplicate data records within a database and delete those duplicate data records, but these systems may only locate data records which are substantially identical to each other. Thus, these conventional systems cannot determine if two data records, with, for example, slightly different last names, nevertheless contain information about the same entity. In addition, these conventional systems do not attempt to index data records from a plurality of different information sources, locate data records within the one or more information sources containing information about the same entity, and link those data records together. Consequently, it would be desirable to be able to associate data records from a plurality of information sources which pertain to the same entity, despite discrepancies between attributes of these data records and be able to assemble and present information from these various data records in a cohesive manner. In practice, however, it can be extremely difficult to provide an accurate, consolidated view of information from a plurality of information sources.

SUMMARY

As data records from various sources may be different in both format and in the data which they contain, the configuration of data processing systems may present a Herculean task. These difficulties are in part caused because the configuration process may be a manually intensive task requiring a great deal of specialized knowledge of the architecture and abilities of the system being utilized for association of data records and, in addition, a large degree of analysis and minute attention to detail to ensure that the resulting configuration of the algorithm(s) used to associate data records will yield the desired results.

These difficulties may be further exacerbated by the individual needs of users of such a system. For example, in certain industries such as health care industries it may be critical that data records not be associated with one another incorrectly (referred to as a false positive) while in other less critical industries may be less concerned with the incorrect association and more concerned that data records which might pertain to the same entity be associated to avoid the case where data records which should be associated are not (referred to as false negatives). In fact, certain users may have strict requirements or guidelines pertaining to the number of false positives or false negatives allowed.

As at least certain portions of the system may be configured or tuned utilizing a sample set of data, the configuration of the system established based upon this initial sample set of data may not yield the desired results when applied to all data, or a larger sampling of, data.

It may be difficult, however, to determine how the system is functioning with respect to a certain configuration and, even if it can be determine how the system is functioning it may be difficult to correct the configuration to achieve the desired result as the algorithms utilized by the system may be quite complex.

Thus, there is a need for system and methods for analyzing the functioning of a system for the association of data records such that the system may be configured according to a user's desire.

Embodiments disclosed herein provide systems and methods for analyzing and presenting performance parameters in connection with a system for the indexing or associating of data records. These systems and methods may provide useful software tools for the statistical analyses and presentations of data regarding the configuration or performance of Identity Hub™ by Initiate Systems, Inc. Example embodiments of Initiate Identity Hub™ can be found in the U.S. Patent Applications referenced in this disclosure.

In some embodiments, these tools include a bucket analysis tool, a data analysis tool, an entity analysis tool, and a linkage analysis or threshold analysis tool. More specifically, in one embodiment, a bucket analysis tool may be operable to analyze and present data pertaining to candidate generation and selection (i.e., bucketing) within an identity hub. In one embodiment, an entity analysis tool may be operable to analyze and present data pertaining to the association of data records. In one embodiment, a linkage analysis tool may be operable to analyze and present data related to the setting for various threshold levels for linking data records and their effects on the system. The tools may also provide predictive capability such that a user may submit a possible value for a parameter and the tool may calculate and predict the effect(s) of that value on the operation or performance of the system.

In some embodiments, a graphical user interface may be presented for use with these various tools such that data relating to the configuration or performance of an identity hub may be graphically presented to a user and provide the user with the ability to interact with the analysis tools to obtain the desired information. This graphical user interface may also be provided in conjunction with another graphical user interface, or comprise functionality thereof, for the configuration of at least a portion of an identity hub, such that a user may alter the configuration of the identity hub and analyze the results of such a configuration. These interfaces may, for example, include one or more web pages which may be accessed through a web browser. These web pages may for example be in HTML or XHTML format, and may provide navigation to other web pages via hypertext links. These web pages may be retrieved by a user (e.g., using Hypertext Transfer Protocol or HTTP) from a local computer or from a remote web server where the server may restrict access only to a private network (e.g. a corporate intranet) or it may publish pages on the World Wide Web.

In one embodiment, such a graphical user interface may be presented within a configuration tool, such that various analytics may be presented to a user configuring an identity hub when necessary such that a user may find data anomalies within data in the information sources utilized with the identify hub. Such an interface may also provide the ability to save the determined statistics or other identity hub parameters in a particular configuration of the identity hub, such that the functioning of the identity hub may be compared at various times and across various configurations.

When a data record comes into an identity hub, or the identity hub is searched based upon one or more criteria, one or more buckets may be created. Thus, the performance of the system (e.g., throughput time, etc.) may be heavily dependent on the size of the buckets created in a given instance. Consequently, it may be desired to obtain statistics on the size or type of buckets created, why these buckets were created, how these buckets were created, the data records comprising these buckets, how these buckets affect performance of the system, etc.

Therefore, in one embodiment, a bucket analysis tool may provide a profile of bucketing distribution, such as the size of the various buckets generated and the various data records which comprise these buckets along with the various data records associated with the identity hub which did not get placed in a bucket. Large buckets (e.g., over a thousand data records) may indicate that the data frequency is other than expected or that certain anonymous or common data values have not been properly accounted for. For example, if the name "John Doe" is utilized by an organization for unknown data records this name may show up an unusual number of times. Small buckets may indicate that the bucketing criteria currently being utilized may be too stringent.

Consequently, the bucketing analysis tool may provide not only a profile of bucketing distribution but the effect that the distribution, or another distribution, will have on the throughput of the identity hub to ensure that the performance of the identity hub is within the desired range. In the same vein, the bucket analysis tool may provide the ability to view or analyze the algorithm used to create the buckets and the particular data records which make up those buckets and the ability to reconfigure identify hub or certain parameters of the identity hub either directly or through another application. In conjunction with this functionality the bucket analysis tool may also provide the ability to estimate the performance of identity hub under a real time load such that it can be ensured that performance is within desired parameters.

In certain cases, because of anomalies within member data records certain data records may be incorrectly linked or associated (e.g., as entities) while no or little linking between data records also may indicate problems. These data anomalies and other issues associated with the linking or associating of data records may therefore be better analyzed or diagnosed by analyzing the distribution of entity sizes. In one embodiment, an entity analysis tool may provide the ability to calculate and display the distribution of entity sizes, showing how many entities comprise one data records, how many entities comprise two data records, etc. An odd distribution or outliers within this distribution can indicate problems, or indicate that alterations to the configuration of the identity hub need to take place (e.g., anonymous names or addresses). The entity analysis tool may provide further analytical abilities. One example analytical ability may be the ability to view the distribution groups by size, to analyze individual entities within a distribution group (e.g., entitles comprising three member data records), to view individual member data records within an entity (e.g., view the value of the member data record's attributes) or to compare two or more members within an entity (e.g. compare the values of the attributes of the two members) so it may be determined why these member data records were linked, etc.

Embodiments of an identity hub may be configured with softlink and autolink thresholds. These thresholds may greatly affect the performance of the identity hub. Thus, some embodiments disclosed herein provide the abilities for a user to analyze and see how the configured softlink and autolink thresholds affect system performance (e.g., false negatives or false positives, throughput, etc.) and to analyze how adjustments to these various thresholds may alter the performance of the identity hub.

More specifically, in some embodiments, these interfaces and displays may provide a user with the ability to select desired false positive rates or false negative rates and see the effect on the threshold levels. The user can in some embodiments of a threshold analysis tool disclosed herein determine what threshold levels should be in order to achieve the desired false positive rates or false negative rates. In some embodiments, links between data records that fall between the softlink and the autolink thresholds may have to be reviewed manually. Some embodiments of a threshold analysis tool may provide an estimate of the amount of manual review that may be generated with the configured softlink and the autolink thresholds. Some embodiments of a threshold analysis tool may provide a user with the ability to adjust the false positive and false negative rates or percentages desired and threshold analysis tool will alter to show what threshold levels should be or vice versa.

In one embodiment, a false positive rate may be related to the problem size (e.g., the number of data records), while the false negative rate may be related to the amount of information in each data records. Thus, the false positive rate or curve may be estimated based upon the number of records and the false negative rate or curve may be estimated based upon the distribution of data across all records. As these estimations may be related to the weight generation in conjunction with the identity hub, these estimations may be made after such weight generation. Based upon a clerical review of a set of linked data records in which a user may determine whether records have been correctly or incorrectly linked (e.g., which may take place during configuration of the identity hub), these curves may then be adjusted, fitted or corrected using a performance analysis tool. In some embodiments, these curves may be graphically presented to a user in conjunction with graphical representation of the thresholds such that the user may adjust the various false positive or false negative rates and see where the various thresholds should be set and the amount of manual review that may result from these thresholds.

Accordingly, embodiments disclosed herein can analyze in real time the configuration and performance of an identity hub capable of processing and matching large sets of data records. These tools provide a way to ensure the throughput of the identity hub and the quality of the analytics (deliverables) generated by the identity hub meet user demands. Other features, advantages, and objects of the disclosure will be better appreciated and understood when considered in conjunction with the following description and the accompanying drawings.

BRIEF DESCRIPTION OF THE SEVERAL VIEWS OF THE DRAWINGS

The drawings accompanying and forming part of this specification are included to depict certain aspects of the disclosure. A clearer impression of the disclosure, and of the components and operation of systems provided with the disclosure, will become more readily apparent by referring to the exemplary, and therefore non-limiting, embodiments illustrated in the drawings. Wherever possible, the same reference numbers will be used throughout the drawings to refer to the same or like features (elements). The drawings are not necessarily drawn to scale.

FIGS. 8A and 8B depict screenshots of one embodiment of a configuration editor through which a job configuration is modifiable.

FIGS. 9A and 9B depict screenshots of one embodiment of an algorithm editor through which each algorithm associated with an entity type in an identity hub is modifiable.

DETAILED DESCRIPTION

Figure 1:
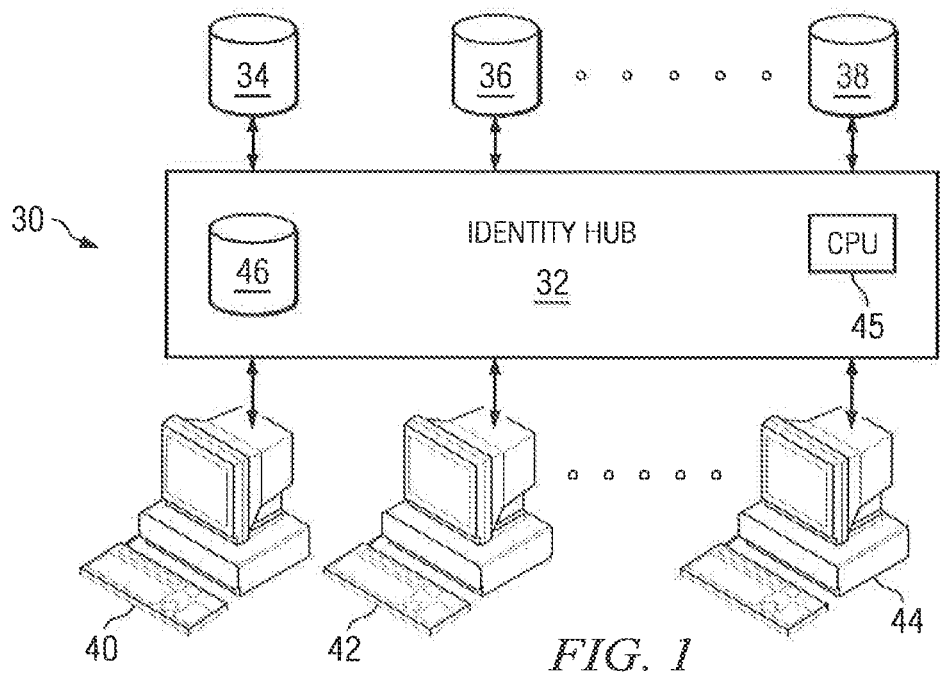
FIG. 1 depicts an example infrastructure of one embodiment of a system for matching data records.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference is now made in detail to the exemplary embodiments of the disclosure, examples of which are illustrated in the accompanying drawings. Wherever possible, the same reference numbers will be used throughout the drawings to refer to the same or like parts (elements).

Some embodiments disclosed herein can leverage an embodiment of a system and method for indexing information about entities from different information source, as described in U.S. Pat. No. 5,991,758, issued Nov. 23, 1999, which is incorporated herein by reference. Some embodiments disclosed herein can leverage an embodiment of an entity processing system and method for indexing information about entities with respect to hierarchies, as disclosed in the above-referenced U.S. patent application Ser. No. 11/656,111, filed Jan. 22, 2007, entitled "METHOD AND SYSTEM FOR INDEXING INFORMATION ABOUT ENTITIES WITH RESPECT TO HIERARCHIES," which is also incorporated herein by reference.

FIG. 1 is a block diagram illustrating an example infrastructure of one embodiment of entity processing system 30. Entity processing system 30 may include identity Hub 32 that processes, updates, or stores data pertaining to data records about one or more entities from one or more information sources 34, 36, 38 and responds to commands or queries from a plurality of operators 40, 42, 44, where the operators may be human users and/or information systems. Identity Hub 32 may operate with data records from a single information source or, as shown, data records from multiple information sources. The entities tracked using embodiments of Identity Hub 32 may include, for example, patients in a hospital, participants in a health care system, parts in a warehouse, or any other entities that may have data records and information contained in data records associated therewith. Identity Hub 32 may be one or more computer systems with at least one central processing unit (CPU) 45 executing computer readable instructions (e.g., a software application) stored on one or more computer readable storage media to perform the functions of Identity Hub 32. Identity Hub 32 may also be implemented using hardware circuitry or a combination of software and hardware as would be understood by those skilled in the art.

In the example of FIG. 1, Identity Hub 32 may receive data records from information sources 34, 36, 38 as well as write corrected data back into information sources 34, 36, 38. The corrected data communicated to information sources 34, 36, 38 may include information that was correct, but has changed, information about fixing information in a data record, and/or information about links between data records.

In addition, one of operators 40, 42, 44 may transmit a query to Identity Hub 32 and receive a response to the query back from Identity Hub 32. Information sources 34, 36, 38 may be, for example, different databases that may have data records about the same entities. For example, in the health care field, each information source 34, 36, 38 may be associated with a particular hospital in a health care organization and the health care organization may use Identity Hub 32 to relate the data records associated with the plurality of hospitals so that a data record for a patient in Los Angeles may be located when that same patient is on vacation and enters a hospital in New York. Identity Hub 32 may be located at a central location and information sources 34, 38, 38 and users 40, 42, 44 may be located remotely from Identity Hub 32 and may be connected to Identity Hub 32 by, for example, a communications link, such as the internet or any other type communications network, such as a wide area network, intranet, wireless network, leased network, etc.

In some embodiments, Identity Hub 32 may have its own database 46 that stores complete data records in Identity Hub 32. In some embodiments, Identity Hub 32 may also only contain sufficient data to identify a data record (e.g., an address in a particular data source 34, 36, 38) or any portion of the data fields that comprise a complete data record so that Identity Hub 32 can retrieve the entire data record from information source 34, 36, 38 when needed. Identity Hub 32 may link data records together containing information about the same entity utilizing an entity identifier or an associative database separate from actual data records. Thus, Identity Hub 32 may maintain links between data records in one or more information sources 34, 36, 38, but does not necessarily maintain a single uniform data record for an entity.

In some embodiments, Identity Hub 32 may link data records in information sources 34, 36, 38 by comparing a data record (received from an operator, or from a data source 34, 36, 38) with other data records in information sources 34, 36, 38 to identify data records which should be linked together. This identification process may entail a comparison of one or more of the attributes of the data records with like attributes of the other data records. For example, a name attribute associated with one record may be compared with the name of other data records, social security number may be compared with the social security number of another record, etc. In this manner, data records which should be linked may be identified.

It will be apparent to those of ordinary skill in the art, that information sources 34, 36, 38 and operators 40, 42, 44 may be affiliated with similar or different organizations and/or owners and may be physically separate and/or remote from one another. For example, information source 34 may be affiliated with a hospital in Los Angeles run by one health care network, while information source 36 may be affiliated with a hospital in New York run by another health care network perhaps owned by a French corporation. Thus, data records from information sources 34, 36, 38 may be of different formats, different languages, etc.

Figure 2A:
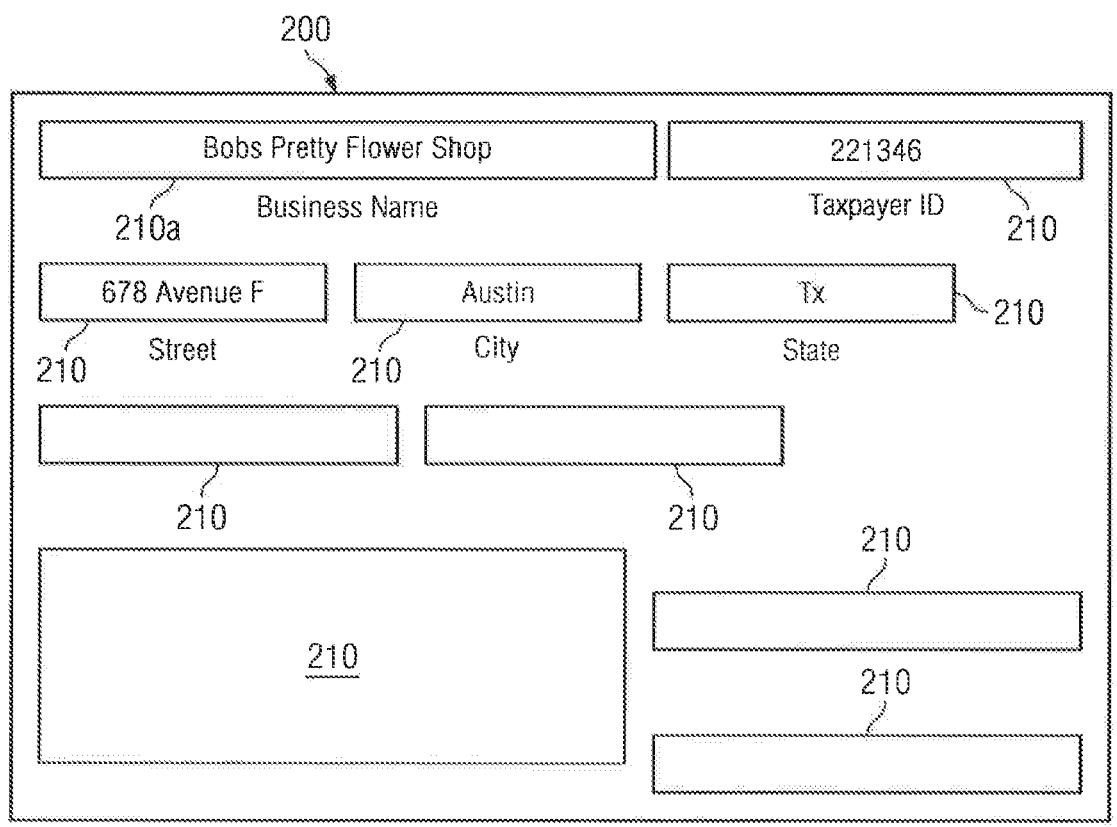
FIGS. 2A and 2B depict a representation of two embodiments of data records.
Figure 2B:
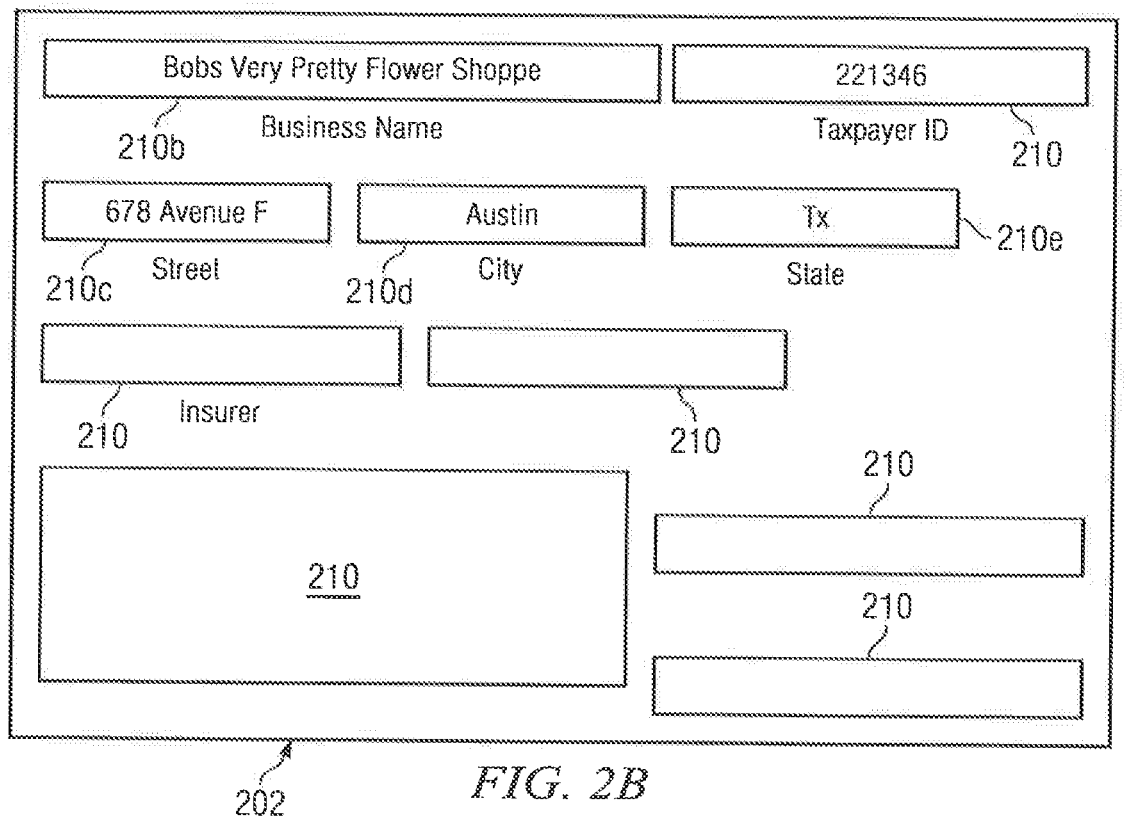

This may be illustrated more clearly with reference to FIGS. 2A and 2B, depicting two embodiments of example data records. Each of these data records 200, 202 has a set of fields 210 corresponding to a sot of attributes of each of the data records. For example, one of the attributes of each of the records 200 may be a name, another attribute may be a taxpayer number, etc. It will be apparent that an attribute may comprise multiple fields 210 of data records 200, 202. For example, an address attribute of data record 202 may comprise fields 210c, 210d and 210e, the street, city and state fields, respectively.

However, each of data records 200, 202 may have a different format. For example, data record 202 may have a field 210 for the attribute of "Insurer", while data record 200 may have no such field. Moreover, similar attributes may have different formats as well. For example, name field 210b in record 202 may accept the entry of a full name, while name field 210a in record 200 may be designed to allow entry of a name of a limited length. Such discrepancies may be problematic when comparing two or more data records (e.g., attributes of data records) to identify data records which should be linked. For example, the name "Bobs Flower Shop" is similar, but not exactly the same as "Bobs Very Pretty Flower Shoppe." Furthermore, a typo or mistake in entering data for a data record may also affect the comparison of data records and thus the results thereof (e.g., comparing the name "Bobs Pretty Flower Shop" with "Bobs Pretty Glower Shop" where "Glower" resulted from a typo in entering the word "Flower").

Business names in data records may present a number of fairly specific problems as a result of their nature. Some business names can be very short (e.g., "Quick-E-Mart") while others can be very long (e.g., "San Francisco's Best Coffee Shop"). Additionally, business names may frequently use similar words (e.g., "Shop", "Inc.", "Co.") which, when comparing data records in the same language, should not weigh heavily in any heuristic for comparing these names. Furthermore, acronyms are frequently used in business names, for example a business named "New York City Bagel" may frequently be entered into a data record as "NYC Bagel."

As will be further described in details below, embodiments of Identity Hub 32 disclosed herein employ algorithms that can take into account these specific peculiarities when comparing business names. Specifically, some algorithms employed by Identity Hub 32 support acronyms, take into account the frequency of certain words in business names, and consider the ordering of tokens within a business name (e.g., the name "Clinic of Austin" may have been deemed virtually identical to "Austin Clinic"). Some algorithms utilize a variety of name comparison techniques to generate a weight based on the comparison (e.g., similarity) of names in different records where this weight could then be utilized in determining whether two records should be linked, including various phonetic comparison methods, weighting based on frequency of name tokens, initial matches, nickname matches, etc. In some embodiments, the tokens of the name attribute of each record would be compared against one another, using methodologies to match the tokens (e.g., if the tokens matched exactly, phonetically, etc.). These matches could then be given a weight, based upon the determined match (e.g., an exact match is given a first weight, while a certain type of initial match is given a second weight, etc.). These weights could then be aggregated to determine an overall weight for the degree of match between the name attribute of two data records. Exemplary embodiments of a suitable weight generation methodology are described in the above-referenced U.S. patent application Ser. No. 11/809,792, filed Jun. 1, 2007, entitled "SYSTEM AND METHOD FOR AUTOMATIC WEIGHT GENERATION FOR PROBABILISTIC MATCHING," which is incorporated herein by reference. Exemplary embodiments of suitable name comparison techniques are described in the above-referenced U.S. patent application Ser. No. 11/522,223, filed Sep. 15, 2006, entitled "METHOD AND SYSTEM FOR COMPARING ATTRIBUTES SUCH AS PERSONAL NAMES" and Ser. No. 11/521,928, filed Sep. 15, 2006, entitled "METHOD AND SYSTEM FOR COMPARING ATTRIBUTES SUCH AS BUSINESS NAMES," both of which are incorporated herein by reference.

Figure 3:
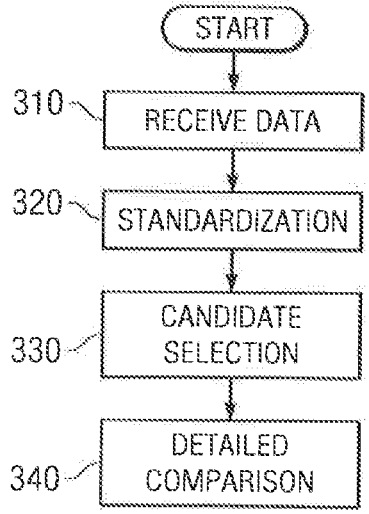
FIG. 3 depicts a flow diagram for one embodiment of comparing data records.

FIG. 3 depicts an example of a methodology for identifying records pertaining to the same entity. At step 310, a set of data records may be pushed or pulled at Identity Hub 32 for evaluation. These data records may include, for example, one or more new data records to compare to a set of existing data records (which may already exist in, for example, information sources 34, 36, 38 or which may be provided to Identity Hub 32). At step 320, the data records for comparison may be standardized if not already standardized. This standardization may comprise the standardization of attributes of a data record such that the data record is transformed from its original format to a standard format in this way, subsequent comparisons between like attributes of different data records may be performed according to the standard format of both the attributes and the data record. It will be apparent to one skilled in the art that each of the attributes of the data records to be compared may be standardized or tokenized according to a different format, a different set of semantics, lexicon, etc., and the standardization of each attribute into its corresponding standard form may be accomplished by a distinct function. Thus, each of the data records may be standardized into a standard format through the standardization of the various attributes of the data records, each attribute standardized by a corresponding function (these attribute standardization functions may, of course, be operable to standardize multiple types of attributes).

For example, field 210a of the name attribute of data record 200 may be evaluated to produce a set of tokens for the name attribute (e.g., "Bobs", "Pretty", "Flower" and "Shop") and these tokens can be concatenated in accordance with a certain form to produce a standardized attribute (e.g., "BOBS:PRETTY:FLOWER:SHOP") such that the standardized attribute may subsequently be parsed to generate the tokens which comprise the name attribute. As another example, when names are standardized, consecutive single tokens can be combined into tokens (e.g., I.B.M. becomes IBM) and substitutions can be performed (e.g., "Co." is replaced by "Company", "Inc." is replaced by "Incorporated", etc.). An equivalence table comprising abbreviations and their equivalent substitutions may be stored in a database associated with Identity Hub 32. Pseudo code for one embodiment of standardizing business names is as follows:

```
BusinessNameParse(inputString, equivalenceTable):
    STRING outputString
    for c in inputString:
```

-continued

```
        if c is a LETTER or a DIGIT:
            copy c to outputString
        else if c is one of the following characters [&,',`] (ampersand,
    single quote, back quote)
            skip c (do not replace with a space)
        else //non-ALPHA-DIGIT [&,',`] character
            if the last character in output string is not a space,
    copy a space to output string.
    //Now extract the tokens.
    tokenList = [ ]
    For token in outputString //outputString is a list of tokens separated
    by spaces
        If (token is a single character and it is followed by one or more
    single characters)
            Combine the singletokens into a single token
        If (equivalenceTable maps token)
            Replace token with its equivalence.
        Append token to tokenList.
    Return tokenList
```

No matter the techniques used, once the attributes of the data records to be compared, and the data records themselves, have been standardized into a standard form at step 320, a set of candidates may be selected from the existing data records to compare to the new or incoming data record(s) at step 330. This candidate selection process (also referred to herein as bucketing) may comprise a comparison of one or more attributes of the new or incoming data records to the existing data records to determine which of the existing new data records are similar enough to the new data records to entail further comparison. Each set of candidates (bucket group) may be based on a comparison of each of a set of attributes between data records (e.g., between an incoming data record and an existing data records) using a candidate selection function (bucketing function) corresponding to the attribute. For example, one set of candidates (i.e., a bucket) may be selected based on a comparison of the name and address attributes using a candidate selection function designed to compare names and another to compare addresses.

At step 340, the data records comprising these set(s) of candidates may then undergo a more detailed comparison to the new or incoming records where a set of attributes are compared between the records to determine if an existing data record should be linked or associated with the new data record. This more detailed comparison may entail comparing one or more of the set of attributes of one record (e.g., an existing record) to the corresponding attribute in the other record (e.g., the new or incoming record) to generate a score for that attribute comparison. The scores for the set of attributes may then be summed to generate an overall score which can then be compared to a threshold to determine if the two records should be linked. For example, if the overall score is less than a first threshold (referred to as the softlink or review threshold), the records may not be linked, if the overall score is greater than a second threshold (referred to as the autolink threshold) the records may be linked, while if the overall score falls between the two thresholds, the records may be linked and flagged for user review.

Figure 4:
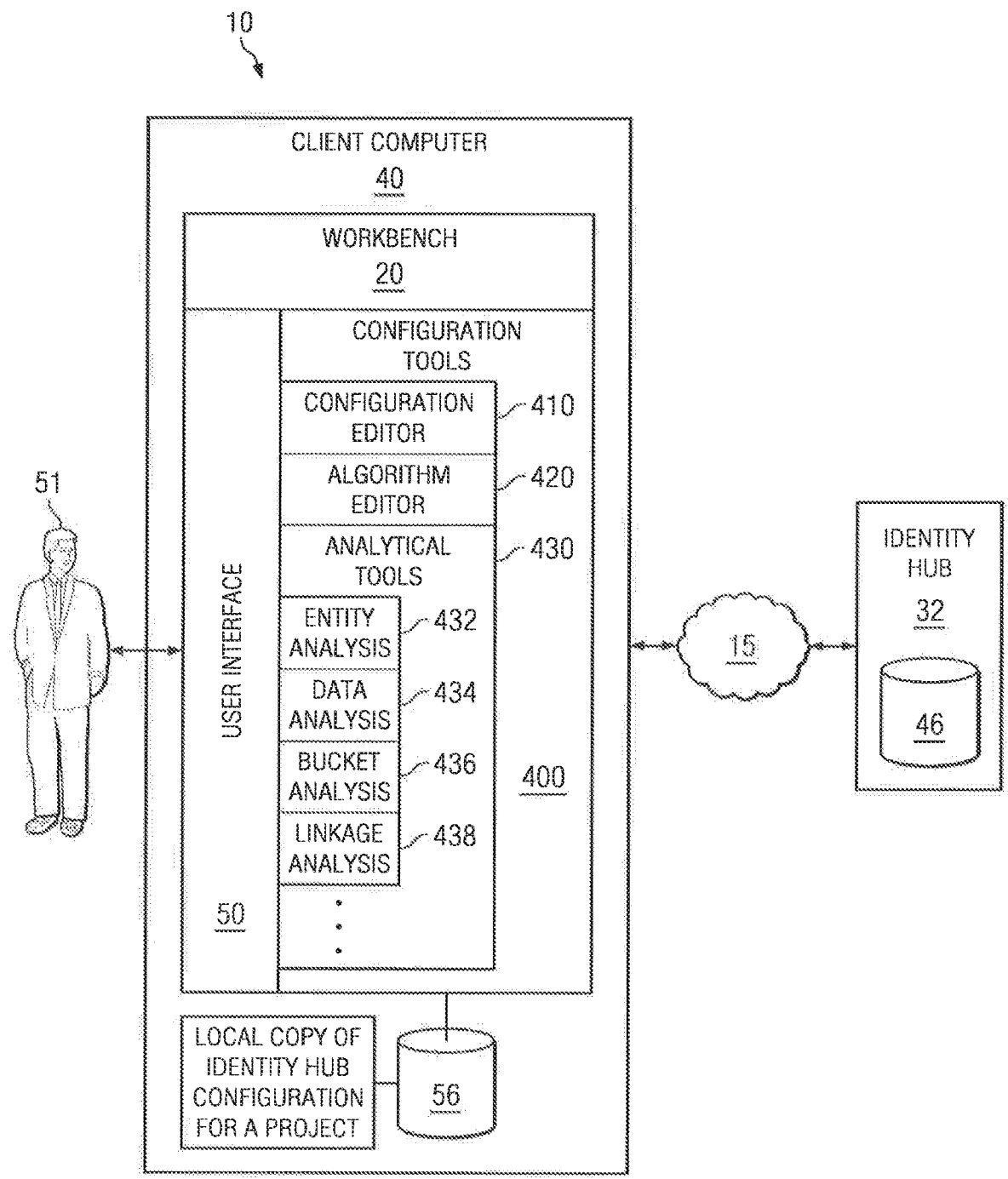
FIG. 4 depicts an infrastructure of one embodiment of a system for configuring and analyzing an identity hub.

FIG. 4 depicts an infrastructure of one embodiment of system 10 for configuring and analyzing a configuration of Identity Hub 32. In some embodiments, system 10 comprises computer 40 and Workbench 20. Workbench 20 is a software program that is stored in a memory of computer 40 and comprises computer instructions readable by a processor of computer 40. Workbench 20 is installed and runs on computer 40 which is in communication with Identity Hub 32 over network 15. Network 15 can be a representation of a public network, a private network, or a combination thereof. Workbench 20 comprises a plurality of functions, including Configuration Tools 400, that are accessible by user 51 through graphical user interface 50. In some embodiments, user interface 50 is a representation of one or more user interfaces for Workbench 20. In some embodiments, through user interface 50, Workbench 20 enables user 51 to create, edit, and/or validate an Identity Hub configuration, store the Identity Hub configuration locally in computer readable storage medium 56, and remotely deploy the validated configuration to an Identity Hub instance of Identity Hub 32 over network 15. Computer readable storage medium 56 may be internal or external to computer 40.

As one skilled in the art can appreciate, computer 40 is a representation of any network-capable computing device particularly programmed with one embodiment of Workbench 20 for configuring and analyzing locally a configuration of an identity hub and deploying a (validated) configuration remotely to an instance of the identity hub over a network. One embodiment of a method for configuring Identity Hub 32 through Workbench 20 will be described below with reference to FIG. 5. One embodiment of user interface 50 for Workbench 20 will be described below with reference to FIG. 6.

In some embodiments, Configuration Tools 400 comprise Configuration Editor 410, Algorithm Editor 420, and Analytical Tools 430. In some embodiments, Analytical Tools 430 comprise Data Analysis Tool 432, Entity Analysis Tool 434, Bucket Analysis Tool 436, and Linkage Analysis Tool 438. In some embodiments, through Configuration Editor 410, Workbench 20 provides user 51 with the ability to create a new configuration of Identity Hub 32 or load an existing configuration of Identity Hub 32 stored on computer readable storage medium 56. In some embodiments, an Identity Hub configuration comprises a view of member records, attributes of the member records, and segments defined for a particular implementation of Identity Hub 32. For further teachings on implementation defined segments, readers are directed to U.S. patent application Ser. No. 11/900,769, filed Sep. 13, 2007, entitled "IMPLEMENTATION DEFINED SEGMENTS FOR RELATIONAL DATABASE SYSTEMS," which is incorporated herein by reference. Details on configuring Identity Hub 32 will be described below with reference to FIGS. 7-8.

Identity Hub 32 utilizes a plurality of algorithms to compare and score member attribute similarities and differences. More specifically, Identity Hub 32 applies the algorithms to data to create tasks and to support search functionality. In some embodiments, through Algorithm Editor 420, Workbench 20 provides user 51 with the ability to define and customize algorithms for a particular implementation of Identity Hub 32. One embodiment of Algorithm Editor 420 will be described below with reference to FIGS. 9A-9B.

In some embodiments, through Data Analysis Tool 432, user 51 can analyze attribute validity of data records in Identity Hub 32. In some embodiments, through Entity Analysis Tool 434, user 51 can analyze entities associated with data records in Identity Hub 32. In some embodiments, through Bucket Analysis Tool 436, user 51 can analyze buckets (groups of candidate records) and an effect of such a bucketing strategy has on identity Hub 32. In some embodiments, through Linkage Analysis Tool 438, user 51 can analyze error rates associated with linking member records and thresholds utilized in scoring derivatives of those records. Some embodiments of Analytical Tools 430 will be described below with reference to FIGS. 10-17.

Figure 5:
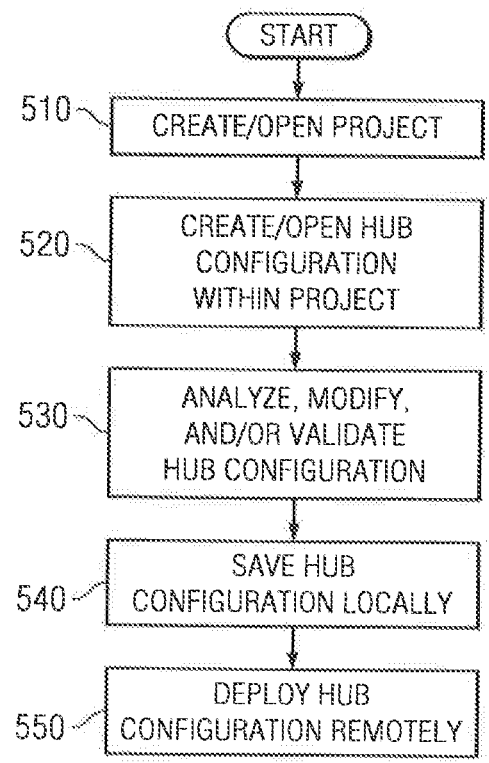
FIG. 5 depicts a flow diagram of one embodiment of a method for configuring an identity hub.

FIG. 5 depicts a flow diagram of one embodiment of a method for configuring Identity Hub 32. Once Workbench 20 is installed and running on computer 40, at step 510, user 51 can access Workbench 20 and create a new Initiate® Project or open an existing Initiate® project. In some embodiments, an Initiate® Project is a container for holding an Identity Hub configuration and files associated therewith. In some embodiments, an Initiate® Project comprises a plurality of artifacts. Examples of the plurality of artifacts include an Identity Hub configuration, an algorithm utilized by that Identity Hub configuration, and the results of prior analysis results from the Analytic Tools (430). At step 520, user 51 can create a new configuration or open an existing configuration within the Initiate® project that is created or opened at stop 510. At step 530, through user interface 50, user 51 can analyze, modify, and/or validate the configuration that is created or opened at step 520. At step 540, user 51 can save the configuration locally at computer 40. At step 550, user 51 can deploy the saved, validated configuration remotely to an instance of Identity Hub 32 via a network connection to a server running the instance of Identity Hub 32. In some embodiments, Identity Hub configurations and algorithms can be deployed directly to an instance of Identity Hub 32 in real time. In some embodiments, some tasks (jobs) may need to be performed directly Identity Hub 32, outside of configuration deployment. In such scenarios, some embodiments of Workbench 20 may provide a means for performing single jobs or grouping jobs within a job set, executing them directly on Identity Hub 32, and displaying the progress or state of the job execution to user 50 within a Workbench view via user interface 50. In some embodiments, user 50 can retrieve or view job results from Identity Hub 32 via user interface 50 at computer 40. For some embodiments of user interface 50, readers are directed to U.S. patent application Ser. No. 11/901,040, filed Sep. 14, 2007, entitled "HIERARCHY GLOBAL MANAGEMENT SYSTEM AND USER INTERFACE," which is incorporated herein by reference.

Figure 6:
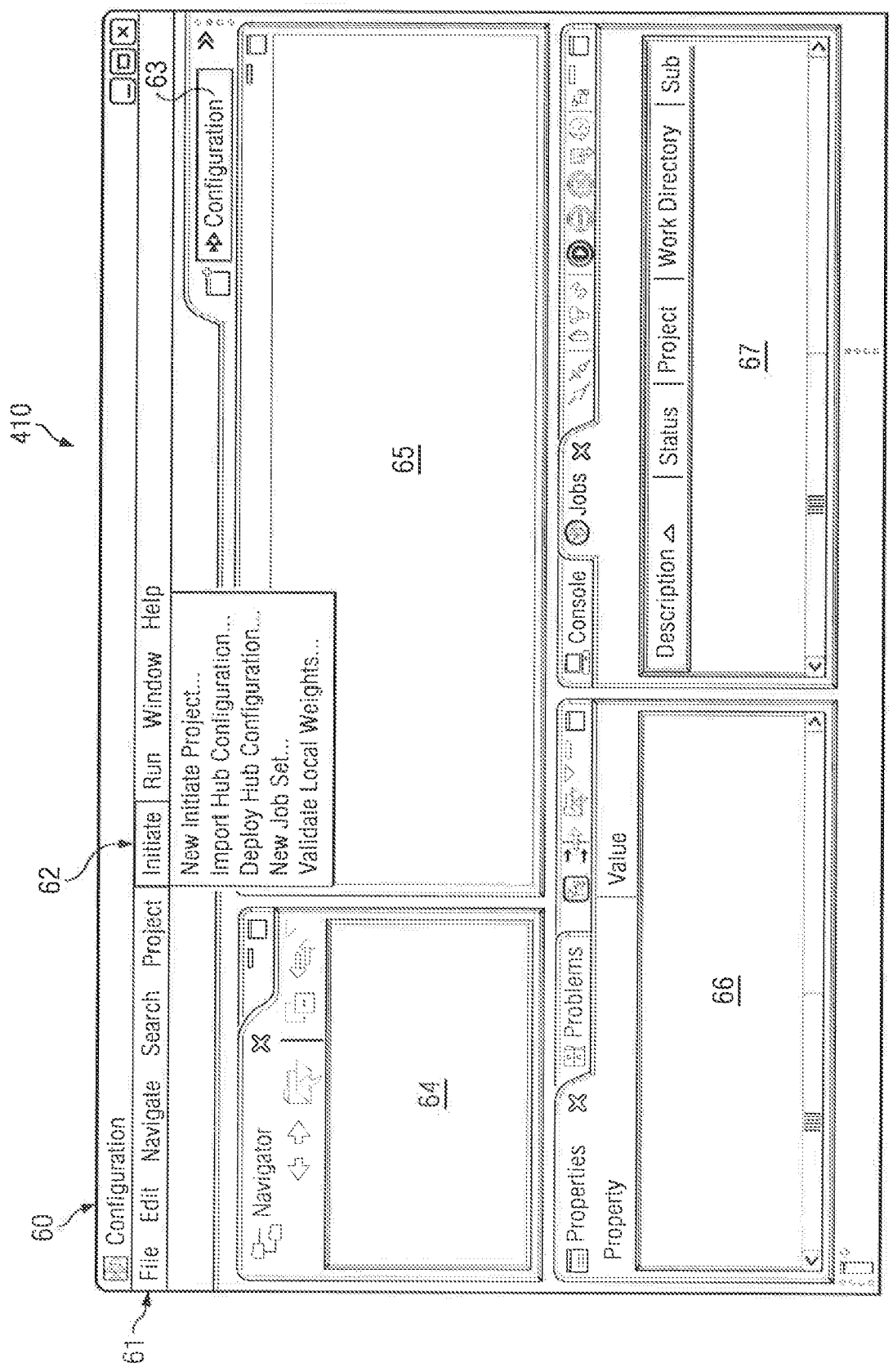
FIG. 6 depicts a screenshot of one embodiment of a graphical user interface through which a configuration of an identity hub is analyzable.

FIG. 6 depicts screenshot 60 of one embodiment of user interface 50. More specifically, screenshot 60 illustrates an example layout of Configuration Editor 410 of Workbench 20 as displayed on computer 40 through one embodiment of user interface 50. In this example, Configuration Editor 410 comprises menu 61, shortcut 63, and a set of work areas called views 64, 65, 66, and 67. Menu 61 provides access to various menu items, each of which provides a different set of functions. For example, through menu item Initiate 62, user 51 can create a new Initiate Project, import an identity hub configuration, deploy an identity hub configuration, create a new job set, or validate local weights, etc. Shortcut 63 provides quick access to Workbench 20 functions that are currently in use. For example, user 51 may quickly switch between Configuration Editor 410 and Analytical Tools 430 via shortcut 63. Views 64, 65, 68, and 67 are individual windows that contain specific types of data. Most views can be moved to different areas of user interface 60 the screen by dragging and dropping their tabs. To change views, user 51 can select Show View under menu item Window from menu 61. The following is a brief description of views included in one embodiment of user interface 50 for Workbench 20. All these views can be hidden and expanded within Workbench 20.

Navigator View

The Navigator view provides a tree structure for browsing the Workbench artifacts. The following functions can be accessed from the Navigator view:

Traverse project directories
Open and view project files
Copy, paste, move, delete and rename project files
Import resources
Refresh imported resources
Select a working set of files (and hide flies not used in the working set)
Deselect a working set of files Properties View The Properties view enables a user to edit the property values of any component created by the user.

Problems View

The Problems view provides a list of configuration and validation problems in Workbench. Most validations are done when file resources in the project are saved, so errors can appear instantly.

Console View

The Console view shows progress messages and errors during extensive background tasks.

Jobs View

The Jobs view shows progress or completion (executed) status of a job or job set. More details on the Jobs view will be described below with reference to FIGS. 8A and 8B.

Analytics View

The Analytics view appears displays the results of an analytics query. In order to see data in this view, Workbench needs to be connected to the Hub for the Hub to process the query.

Search View

The Search view displays the results of a search on existing configurations. A user can open a configuration object by double-clicking a row in the Search view.

Figure 7A:
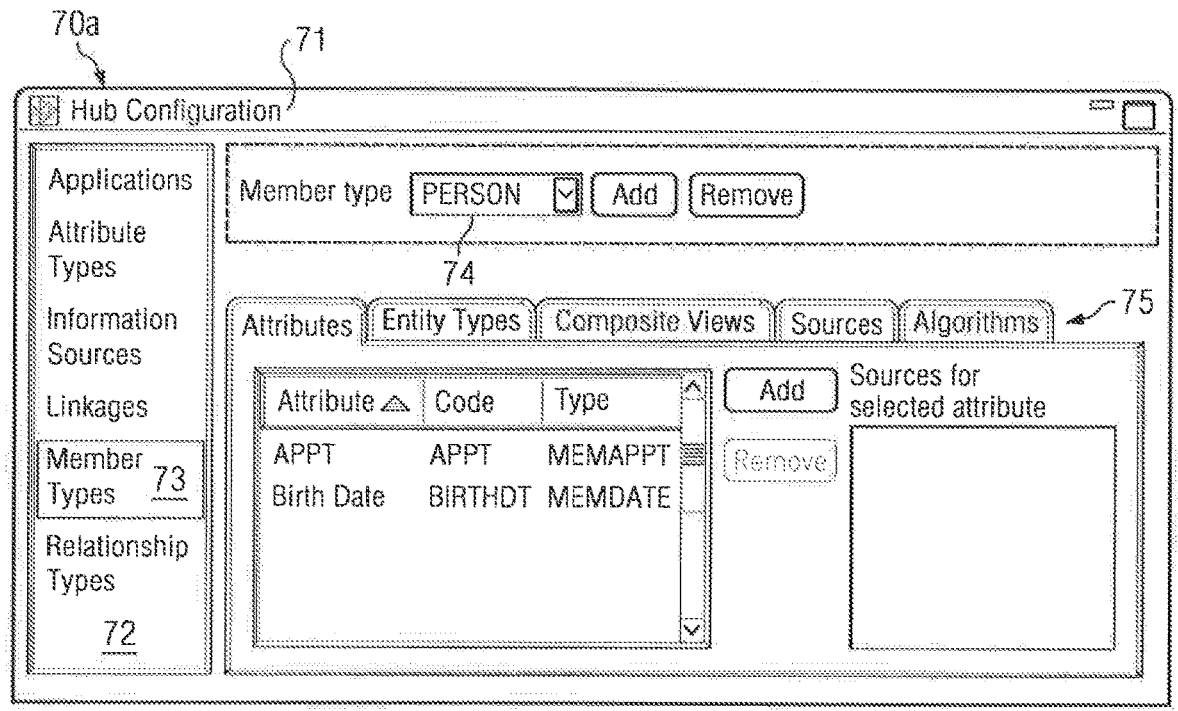
FIGS. 7A and 7B depict screenshots of one embodiment of a configuration editor through which a configuration of an identity hub is modifiable.
Figure 7B:
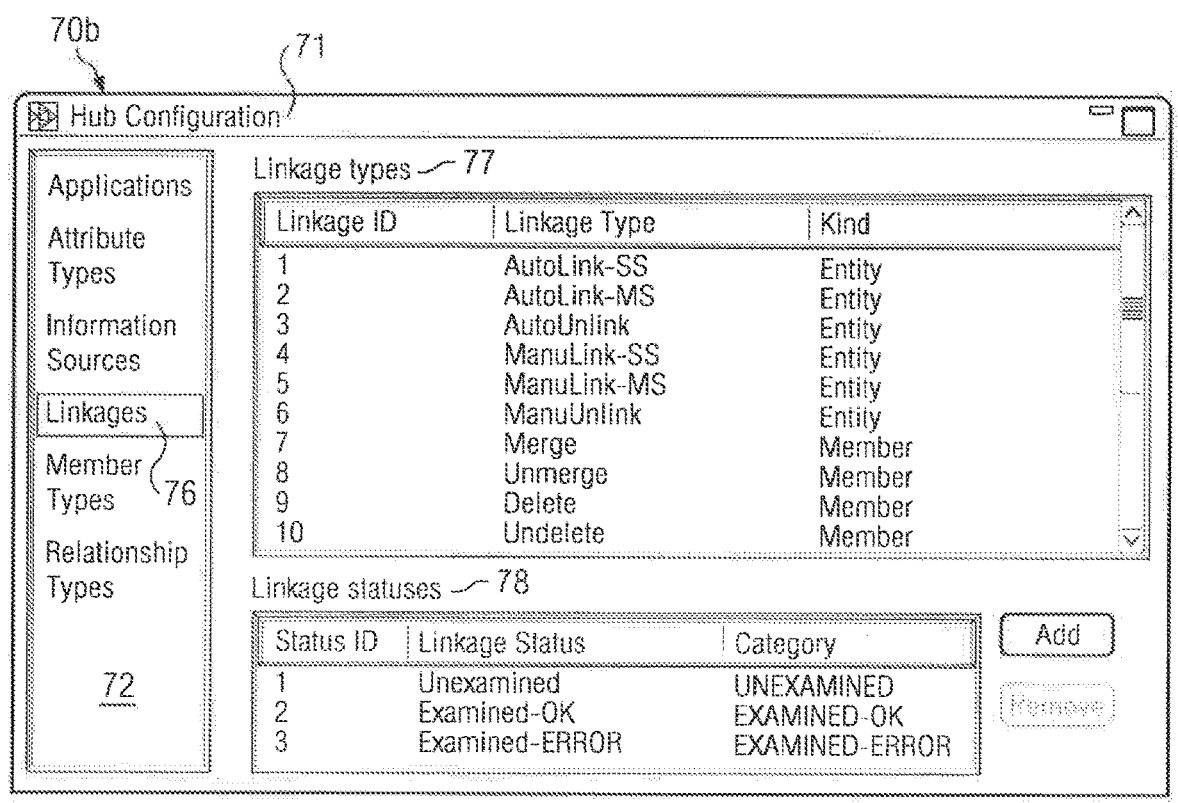

In some embodiments, Workbench 20 provides several special types of editors, such as Configuration Editor 410 and Algorithm editor 420. In some embodiments, Workbench 20 also supports other editor types, including standard text and Java editors. FIGS. 7A and 7B depict screenshots 70a and 70b of one embodiment of Configuration Editor 410 through which Hub Configuration 71 of Identity Hub 32 can be modified.

More specifically, Screenshot 70a depicts a representation of Hub Configuration 71 imported into Workbench 20. In some embodiments, Configuration Editor 410 can comprise navigation menu 72, showing views for Applications, Attribute Types, Information Sources, Linkages, Member Types, Relationship Types, and so on. Referring to FIG. 7A, Member Types view 73 enables a user to add, edit and remove member types. In some embodiments, member types identify the "object category" in which data falls (e.g., Person, Provider, Guest, or Organization). In some embodiments, there are five objects configurable for a particular Member Type, each having its own tab (view): Attributes, Entity Types, Composite Views, Sources and Algorithms.

In some embodiments, the Attribute types view enables a user to view attributes associated with a member type. For example, for Member Type PERSON 74, the Attributes tab may show attributes such as APPT and Birth Date that are associated with Member Type PERSON 74. In this example, the attribute APPT has an attribute type of MEMAPPT and the attribute Birth Date has an attribute type of MEMDATE. In some embodiments, attribute types (segments) coincide with the Initiate® data schema to define Hub behavior and member information. In some embodiments, Attribute Types comprise Member Attribute Types and Relationship Attribute Types. In some embodiments, Member Attribute Types comprise pre-defined ("fixed") attribute types and implementation-defined attribute types, which are described in the above-referenced U.S. patent application Ser. No. 11/900,769, filed Sep. 13, 2007, entitled "IMPLEMENTATION DEFINED SEGMENTS FOR RELATIONAL DATABASE SYSTEMS." Implementation-defined attribute types can be created at the time of the implementation of an identity hub and therefore are not associated with a generated class. Relationship Attribute Types are attribute types that are specific to relationships. An attribute type cannot be both a member attribute type and a relationship attribute type.

In some embodiments, the Entity Types view enables management of entity types such as identity or Household. For further teachings on entity management, readers are directed to U.S. patent application Ser. No. 12/056,720, filed Mar. 27, 2008, entitled "METHOD AND SYSTEM FOR MANAGING ENTITIES" and Ser. No. 11/656,111, filed Jan. 22, 2007, entitled "METHOD AND SYSTEM FOR INDEXING INFORMATION ABOUT ENTITIES WITH RESPECT TO HIERARCHIES," both of which are incorporated herein by reference.

In some embodiments, the composite view represents a complete picture of a member as defined by a user. Configuration of composite views can establish the rules that control the behavior and display of member attribute data in Workbench 20. For example, the member attribute data of a particular member may be made up of Name, Address, Phone, and Social Security number.

In some embodiments, the Sources view enables a user to add and manage information about the sources that interact with Workbench 20. Examples of sources may include definitional sources and informational sources. Examples of informational sources may include sources 34, 36, 38 described above. A definitional source is one in which members (records) are created and usually updated. In some embodiments, Workbench 20 may send updates to a definitional source.

In some embodiments, the Algorithms tab enables a user to create or identify the active algorithm that the Hub uses to process comparisons. In some embodiments, only one algorithm can be active per member type on a Hub instance. These algorithms (active and inactive) are based on the member types currently defined in the Hub configuration. Each newly created algorithm must be associated with a member type in the Hub configuration (see FIGS. 9A and 9B).

In some embodiments, linkages can be formed either automatically for records scoring above the auto-ink threshold (autolink) or manually by users during task resolution (clerical review). The purpose of linkages is to enable an accurate enterprise-wide view of a member (record). Referring to FIG. 7B, in some embodiments, the Linkages view 76 of Configuration Editor 410 may provide Linkage types 77 and Linkage statuses 78. This functionality can be used to add or edit linkage types and associated statuses. In this example, Linkage types 77 lists Linkage ID, Linkage Type, and Kind, defining valid entity relationships while Linkage statuses 78 lists Status ID, Linkage Status, and Category, representing the workflow status of the enterprise relationships. In some embodiments, these columns may be sorted in an ascending or descending order by clicking on a column heading.

Referring briefly to FIG. 7A, navigation menu 72 also shows the Applications view and the Relationship types view. The Applications view may list several functions. In some embodiments, a user can use the functions in this component to mark an application active or inactive. In some embodiments, an enterprise user can add and remove Initiate® applications implemented at the enterprise's site from the Applications view. The Relationship types view may show available relationship types. A Relationship Type is a type of association that can exist between two different (or same) entity types. For example, a person can manage another person, or an organization can legally own another organization. In some embodiments, a user can use the functions in this component to manage relationships between entities. For further teachings on relating information about entities, readers are directed to U.S. patent application Ser. No. 11/904,750, filed Sep. 28, 2007, entitled "METHOD AND SYSTEM FOR INDEXING, RELATING AND MANAGING INFORMATION ABOUT ENTITIES," which is incorporated herein by reference. For the sake of brevity, not all available views are shown or described in this disclosure. However, one skilled in the art can appreciate that additional views and additional functionalities provided through such views are also possible. For example, a Strings view may enable a user to create rules or guidelines for instructing an algorithm on how to handle certain incoming data values. As another example, an Auditing view may enable a user to establish audit logging for interactions with Identity Hub 32 and the users performing those interactions.

In some embodiments of Workbench 20, a container that holds a Hub configuration and its associated files is referred to as a project. Before importing a Hub configuration into a project, a user would need to create a new project or import an existing project. To create a new project, a user can select New Initiate Project . . . from Initiate menu 61 and enter a name for the new project. The new project may be created, perhaps using a Workbench template, in a current workspace directory or in a location outside of the current workspace (such as another local drive or network drive) as specified by the user. For further teachings on some embodiments of project management, readers are directed to U.S. patent Ser. No. 11/824,210, filed Jun. 29, 2007, entitled "METHOD AND SYSTEM FOR PROJECT MANAGEMENT," which is incorporated herein by reference.

Workbench 20 next creates the project and adds the following directories under the workspace directory:
flows—contain flow files (.iflow)
functions—contain any custom functions
lib—contain any additional Java code library files needed for deployment (.jar)
services—contain all data source WSDL files imported into the project (.wsdl)
src—contain any additional Java source files needed (.java)
anonutil—contains sample default value files and filter files
handlers—contains scripting support for packaging Java handlers
jobs—stores information related to hub-to-project registrations The project is associated with Identity Hub 32 via a connection to a server running an instance of Identity Hub 32. There are several types of connections, including production and test. In some embodiments, a connection to an instance of Identity Hub 32 can be added, edited, or removed by accessing corresponding functions under menu item Initiate 62 from menu 61 (see FIG. 6). A Hub configuration can be imported into a project by accessing the Import Hub Configuration . . . function from Initiate menu 62. In some embodiments, user name and password may be needed to retrieve the Hub configuration information from Identity Hub 32. In some embodiments, the name of the imported Hub configuration may be shown in Navigator view 64 of Configuration Editor 410 and components of the imported Hub configuration may be shown in workspace 65.

FIGS. 8A and 8B depict screenshots 80a and 80b of one embodiment of Configuration Editor 401 through which a job configuration can be modified. In some embodiments of Workbench 20, a task performed by Identity Hub 32 may be referred to as a job and groupings of one or more jobs may be referred to as job sets. In some embodiments, available jobs (tasks) may be categorized into configuration jobs, data analysis Job, hub administration jobs, etc. In some embodiments, job results can be stored by project on the server running Identity Hub 32 server and, in many cases, can be retrieved or viewed from the server at computer 40. In some embodiments, through the Jobs view in Configuration Editor 410, the following non-exhaustive list of tasks may be performed:
Deploying a configuration to the Hub
Generating weights
Creating threshold analysis pairs
Retrieving a file from the Hub
Deploy Hub Configuration This utility deploys a configuration project to the Hub. This job can be used (instead of the Initiate menu option described above) to perform the deployment in conjunction with another job. When this job is executed, the Hub is automatically stopped and restarted. When run from Initiate menu 62, the following options are available:
Deploy weight tables. This option when selected enables the weight tables in the selected Workbench project directory to be deployed to the Hub.
Create and/or drop database tables, if required. This option when selected allows database table operations to be performed as required to support the configuration.
Check group synchronization. This option when selected checks that the job groups listed locally are up to date with the groups defined in the Hub. In one embodiment, if this option is selected and the groups do not match, the deployment may be aborted.

Generate Weights

This utility performs weight generation tasks. This job requires derived data (comparison data and bucketing data) as input. In some embodiments, the derived data files may be generated by utilities such as mpxdata, mpxprep, mpxfsdvd, or mpxredvd during standardization and bucketing steps 320 and 330 described above. As an example, FIG. 8A depicts screenshot 80a, illustrating how this job can be configured through one embodiment of Configuration Editor 401. Specifically, for Entity Type id 84, one embodiment of Configuration Editor 401 may show a plurality of tabs, including Steps, Inputs and Outputs, Performance Tuning, Options, and Log Options. In some embodiments, the Steps tab may allow a user to select a weight generation step to run and indicate whether to run subsequent steps through the end of the process. Examples of weight generation steps may include:
Delete artifacts from previous run
Generate counts for all attribute values
Generate random pairs of members
Derive random data by comparing random members
Perform matched candidate pairs reduction
Generate matched set, matched statistics, and initial weights
Skip last step because of too few attributes
Iterate over previous step and check for convergence of weights
Execute all remaining steps through end of process.

In some embodiments, the Inputs and Outputs tab may allow a user to specify various input/output directories. Examples of input/output directories may include:

BXM input directory specifies the input directory from which the bulk-cross-match results are read. This directory must match the Output Directory used by the mpx utility that generated the derived data.

Working directory: specifies the directory where weight tables are to be saved within the Workbench project. In one embodiment, the default is the weights directory. All files are saved to a subdirectory within the specified Working directory named for the entity type.

FRQ output directory: specifies the output directory to which the generated attribute frequency data is written.

UPAIRS output directory: specifies the output directory to which the generated random pairs data is written.

USAMPS output directory: specifies the output directory to which the generated unmatched sample pair data is written.

MPAIRS output directory: specifies the output directory to which the generated matched pair data is written.

MSAMPS output directory: specifies the output directory to which the generated matched pair sample data is written.

RUN output directory: specifies the output directory to which the generated weights are written. This directory is appended with an incremented number for each iteration.

In some embodiments, the Performance Tuning tab may allow a user to modify the following parameters:

Number of threads
Maximum number of iterations in last step
Number of comparison bucket partitions
Number of random pairs bucket partitions
Number of matched pairs bucket partitions
Number of frequency partitions
Maximum number of input/output partitions
Audrecno used for auditing
Number of random pairs to generate
Interval for reporting processed records
Maximum bucket set size
Minimum weight for writing item records In some embodiments, the Options tab may provide a user with the following options:

Encoding. In some embodiments, Workbench 20 supports LATIN1, UTF8, and UTF16 encoding. Other encoding methodologies may also be utilized. For further teachings on parsing data records in different languages, readers are directed to U.S. patent application Ser. No. 11/967,588, filed Dec. 31, 2007, entitled "METHOD AND SYSTEM FOR PARSING LANGUAGES," which is incorporated herein by reference.

Auditing. In some embodiment, Workbench 20 supports an auditing of a set of data records.

Comparison mode. In some embodiment, this option can be used to limit the comparison function. For example, generating weights for match and link only, generating weights for search only, or generating weights for match, link, and search.

In some embodiments, the following weight generation parameters can be found under the Options tab for 80a in FIG. 8A. The data here are the threshold used specific to the various sources.

Attribute matched pair percentage threshold (wgt-NRM)—defines the threshold for the third filter used in comparison.

Attribute matched pair threshold (wgtABS)—defines the threshold for the second filter used in attribute comparison.

Convergence threshold (wgtCNV)—defines the tolerance for weight generation conversion.

Data quality percentage for initial weight estimates (wgtQOD)—defines the matched-set error rate.

False negative rate (wgtFNR)—defines the false negative rate used to compute the Clerical Review and Auto-Link thresholds.

False positive rate (wgtFPR)—defines the false positive rate used to compute the Clerical.

Review and Auto-Link thresholds.

Matched pair threshold (wgtMAT)—defines the threshold for the first filter used in comparison.

Minimum attribute count (wgtFLR)—defines a lower bound on attribute-value frequency count.

In some embodiments, the Log Options tab may provide a user with the following logging options:

Trace logging
Debug logging
Timer logging
SQL logging

When this Generate Weights job is complete, the results can be viewed and the weights can be saved locally. In some embodiments, the output of Generate Weights can be copied into the project from the Hub. For further teachings on weight generation, readers are directed to U.S. patent application Ser. No. 11/809,792, filed Jun. 1, 2007, entitled "SYSTEM AND METHOD FOR AUTOMATIC WEIGHT GENERATION FOR PROBABILISTIC MATCHING," which is incorporated herein by reference.

As an example of a data analysis job, FIG. 8B depicts screenshots 80b illustrating how a Threshold Analysis Pair Generation job can be configured through one embodiment of Configuration Editor 401. Specifically, one embodiment of Configuration Editor 401 may allow a user to specify an entity type as well as the appropriate input directory and output file. The user can further specify the number of pairs per score and the range of scores. In the example of FIG. 8B, the minimum score is 8.0 and the maximum score is 25.0. In this example the sample pair generator will pick 10 random pairs in each of 171 score bins (8.0 to 25.0 in increments of 0.1).

Figure 9A:
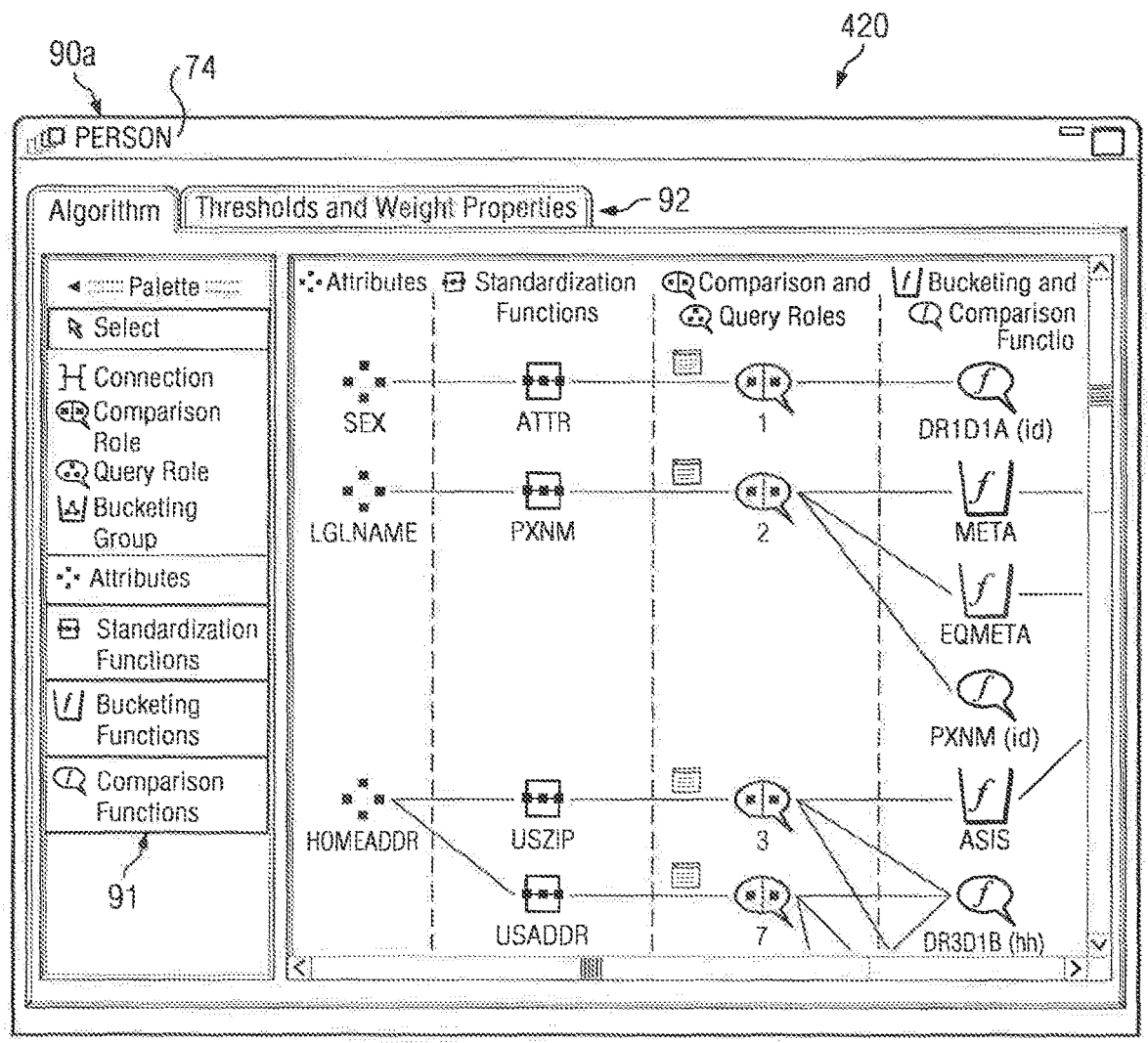
Figure 9B:
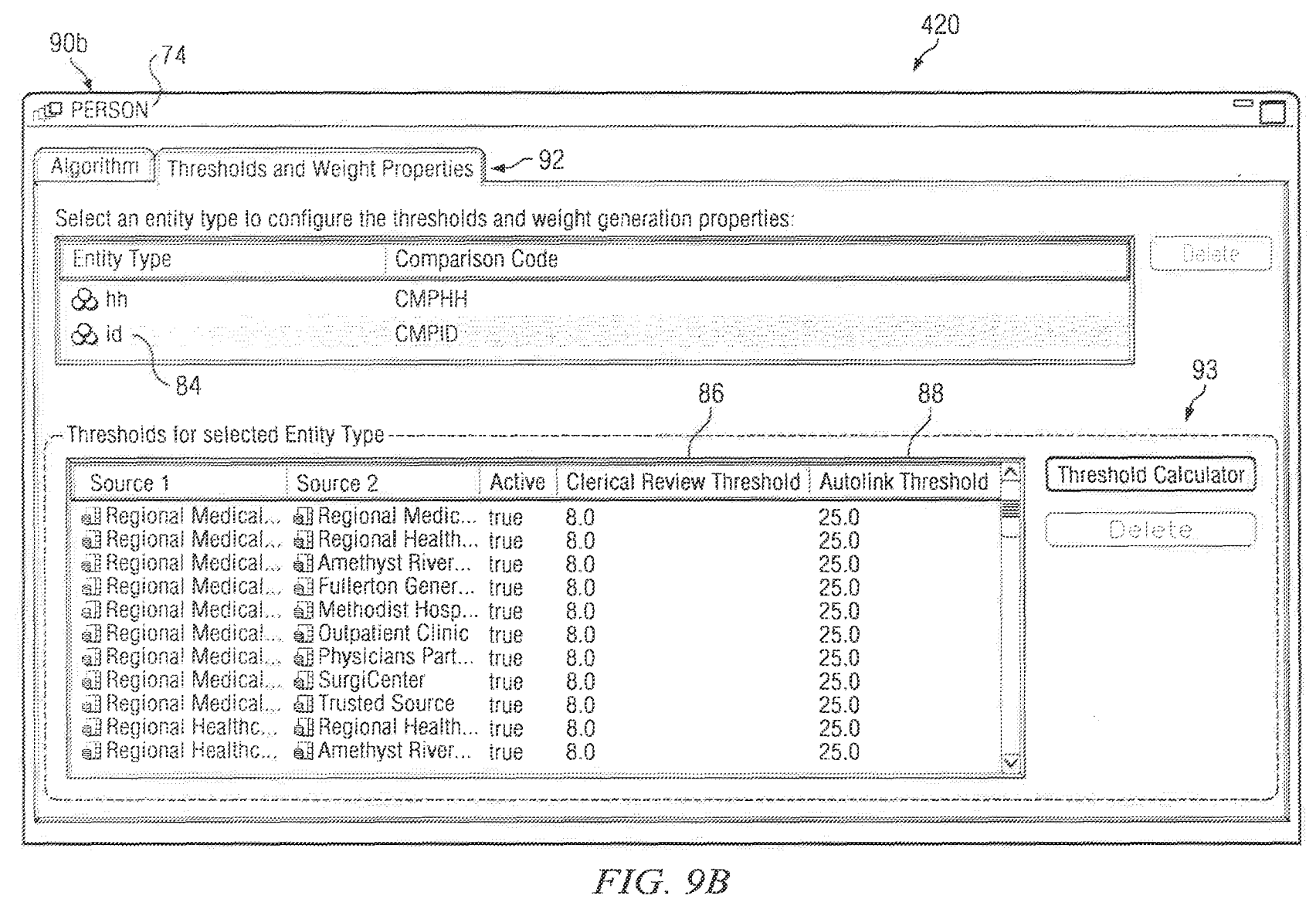

As mentioned above with reference to FIG. 7A, a newly created algorithm must be associated with a member type in the Hub. FIGS. 9A and 9B depict screenshots 90a and 90b of one embodiment of Algorithm Editor 420. In some embodiments, Algorithm Editor 420 enables a user to edit the algorithm files which are used by Identity Hub 32 to apply comparison logic. Specifically, when an algorithm is initially created, it is empty. Algorithm Editor 420 enables the user to add algorithm components and connections from Palette 91 in Algorithm Editor 420 to construct the algorithm. In the example of FIG. 9A, screenshots 90a depicts the algorithm associated with Member Type PERSON 74. In some embodiments, multiple algorithms can be associated with a particular member type, although only one can be set as the "active" algorithm at any given time. Algorithms are edited locally so that no changes are made to the database until they have been validated for integrity.

As FIGS. 9A and 9B illustrate, an algorithm may comprise a plurality of components, including the Attributes component, the Standardization functions component, the Comparison and Query Roles component, and the Bucketing and Comparison function component. A user can modify the algorithm by adding, modifying, or deleting one or more algorithm component(s). The Attributes component allows the user to define the properties or fields for a data element. These attributes are filtered by the algorithm's member type.

The Standardization Functions component comprises functions for standardizing or formatting the incoming source data for comparison, bucketing, and search (query) purposes. This can mean capitalization of all alpha characters, removal of punctuation, anonymous value checks, and data ordering. Once standardized, the data is stored as the comparison components of the derived data and is used in the generation of the bucketing data. In some embodiments, standardized data is not stored in the Hub database and therefore does not change the member data. For example, a phone number may be entered into a source as 232-123-4567. While the standardization routine may strip the dashes and the area code and format the number as 1234567, the number stored in database 46 of Identity Hub 32 remains 232-123-4567. The Comparison and Query Roles component enables the user to define how a comparison function and/or a query function can be used in an algorithm. The Bucketing functions can be used for identifying bucketing data, which identify groups of shared information. For example, buckets may be defined for name (first, last, middle), birth date+last name, address, and Social Security number. This component also enables the user to define a combination of data elements in a bucket. For further teachings on embodiments of Algorithm Editor 420, readers are directed to U.S. patent application Ser. No. 11/702,410, filed Feb. 5, 2007, entitled "METHOD AND SYSTEM FOR A GRAPHICAL USER INTERFACE FOR CONFIGURATION OF AN ALGORITHM FOR THE MATCHING OF DATA RECORDS," which is incorporated herein by reference.

Thus, in one embodiment, a method for analyzing an identity hub may comprise utilizing an initial set of data records to produce a configuration of the identity hub, analyzing buckets created based on that initial set of data records or a subset thereof according to a bucketing strategy associated with the configuration of the identity hub, analyzing an effect of those buckets on the performance of the identity hub, and then changing the bucketing strategy accordingly. In one embodiment, the bucketing strategy can be changed by editing an algorithm utilized in creating the buckets or changing one or more parameter values associated with the algorithm. In one embodiment, the algorithm is associated with an entity type.

In some embodiments, in addition to the above-described core algorithm configuration functions, automatic weight generation parameters can also be configured through Thresholds and Weight Properties tab 92 of Algorithm Editor 420. Since weight properties are associated with entity types, to view weight properties, a user must first select an entity type. In this example, screenshot 90b depicts thresholds and weight properties for Entity Type id 84.

For further teachings on weight generation, including weight generation conversion, readers are directed to U.S. patent application Ser. No. 11/809,792, filed Jun. 1, 2007, entitled "SYSTEM AND METHOD FOR AUTOMATIC WEIGHT GENERATION FOR PROBABILISTIC MATCHING," which is incorporated herein by reference.

Referring to FIG. 9B, after the weights are established, a user can manually set or calculate the appropriate Clerical Review and Autolink thresholds for a particular Hub configuration using Threshold Calculator 93. Threshold Calculator 93 enables a user to use sample data from database 46 of Identity Hub 32 to calculate the appropriate Clerical Review and Autolink thresholds. In some embodiments, the user can also use Threshold Calculator 93 to set a clerical review threshold and autolink threshold to get an estimate on the false positive rate, false negative rate and estimated number of tasks. In some embodiments, the thresholds can be calculated using either an estimated False Positive Rate (FPR) or a statistical FPR based on evaluated sample pair data. These values can be used for selected (or all) source pairs. The statistical option requires a user to first run the Threshold Analysis Pair Generation job described above, and then perform the Get job results action on the completed job.

In some embodiments, candidate thresholds are provided with Workbench 20. A user can review candidate thresholds, tasks, and linkages and determine the appropriate thresholds for a particular Hub configuration. In some embodiments, candidate thresholds can be calculated as follows:

Auto-Link Threshold

The candidate auto-link threshold depends on file size and allowable false-positive rate. Let fpr be the allowable false-positive rate (default value $10^{(-5)}$), and num be the number of records in the dataset. Then the candidate auto-link threshold is $$\text{thresh\_al} = -\ln[-\ln(1-\text{fpr})/\text{num}]/\ln(10)$$

where ln is the natural (base e) logarithm.

Clerical-Review Threshold

The candidate clerical-review threshold is set based upon the desired false-negative rate (fnr). For example, if it is desired for 95% of the duplicates to score above our clerical-review threshold, the default is set at 0.05. The actual fnr value may depend upon the weights calculated for matching, the fraction of the time each attribute has a valid value, and the distribution of those values. A bootstrap procedure may be used to determine the empirical distribution of matched-set scores and calculate the clerical-review threshold from this distribution. For this bootstrap, one is to generate a list of random members, calculate the information for each member, and form an empirical distribution from this sample as follows:

Select numebt random members, with potential redundancy, in the database. Call these, memrecno_1, memrecno_2, . . . , memrecno_numebt. For each of these, score the member against itself (i.e., compute the information for the member). Call these scores $s\_1, s\_2, \ldots, s\_\text{numebt}$. Let s_min be the minimum of these scores, and s_max be the maximum of these scores and create a table from s_min to s_max, incrementing by 0.1, and bin the scores. The table will have n=(s_max−s_min)/0.1 rows as follows:

TABLE 1

Matched-set score distribution

| Value | Count | Frequency |
| --- | --- | --- |
| s_min | c_1 = number of s_i equal to s_min | f_1 = c_1/numebt |
| s_min + 0.1 | c_2 = number of s_i equal to s_min + 0.1 | f_2 = c_2/numebt |
| s_min + 0.2 | c_3 = number of s_i equal to s_min + 0.2 | f_3 = c_3/numebt |
| . . . | . . . | . . . |
| s_max | c_n = number of s_i equal to s_max | f_n = c_n/numebt |

Now, let j be the first index such that $$f\_1 + f\_2 + \ldots + f\_j > \text{fnr}$$

then the candidate clerical-review threshold is $$\text{thresh\_cl} = s\_\min + (j-1)*0.1.$$

In embodiments disclosed herein, the above-described configuration tools are integrated with a set of analysis tools for analyzing various aspects of the configuration, such as buckets and entities. These tools can evaluate the configuration and assist in finding errors and potential performance problems associated with the configuration. Particularly, these tools can assist a user in seamlessly configuring a Hub and validating the correctness of the configuration.

Figure 10A:
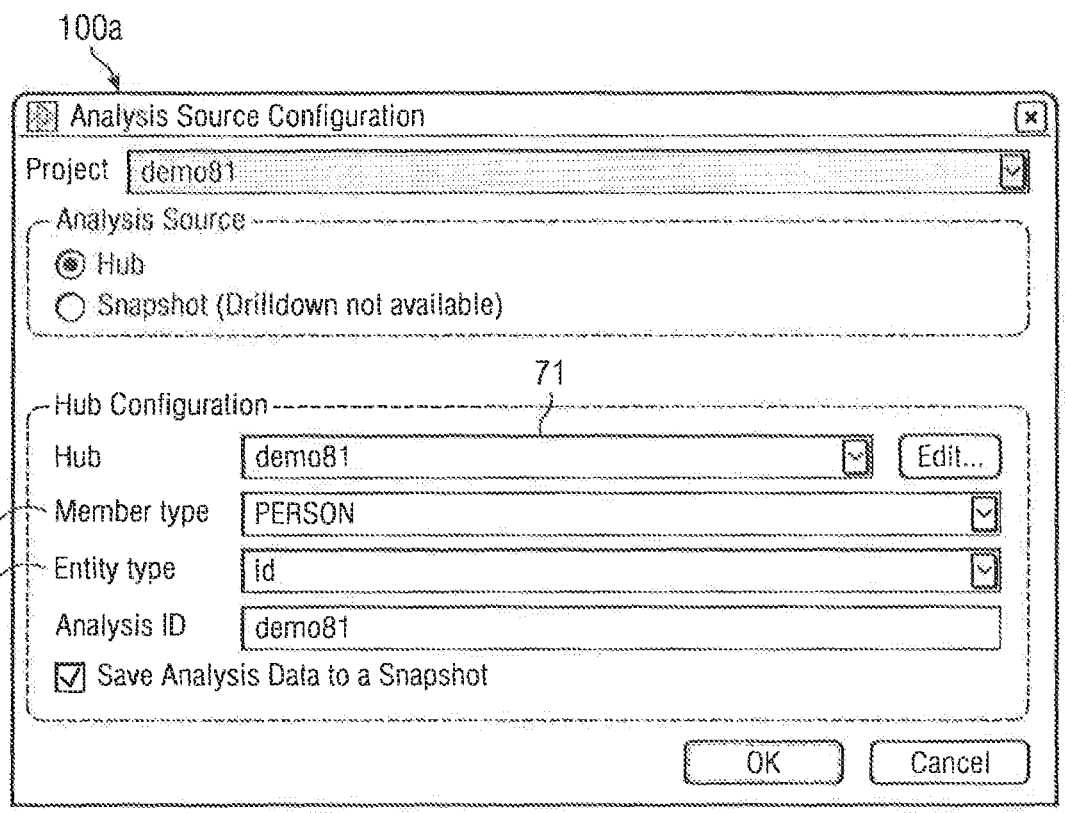
FIGS. 10A and 10B depict screenshots of one embodiment of a graphical user interface through which a configuration of an identity hub is accessible.
Figure 10B:
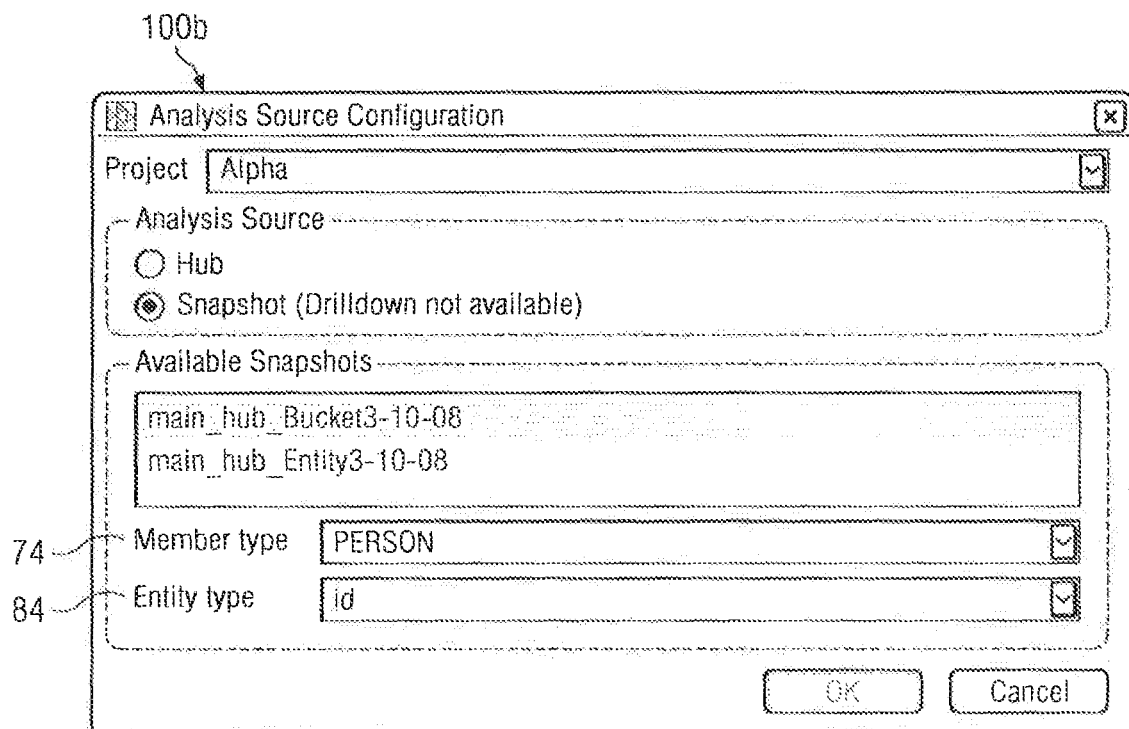

Referring to FIGS. 10A and 10B, some embodiments of Workbench 20 may comprise an Analytics view implementing Analytical Tools 430. The Analytics view may provide a set of query tools to a configuration user to analyze a hub configuration. In order to provide data for analysis, the Analytics view functionality would need to be associated with a Hub instance. FIG. 10A depicts screenshot 100a of one embodiment of user interface 50 showing Hub is selected as the Analysis Source for Project demo 81 and Hub Configuration 71, Member type PERSON 74 and Entity Type id 84 are selected for analysis. As shown in FIG. 10A, analysis data can be saved to a snapshot by selecting the Save Analysis Data to a Snapshot option and providing a name in the Analysis ID field. In some embodiments, snapshots are saved in XML format to the "snapshots" folder in the Navigator view. In some embodiments, referring to FIG. 4, snapshots can be saved locally in computer readable storage medium 56 of computer 40. By saving data into snapshots, a user can compare analysis data from before or after a configuration change is made or from different points in time. Multiple copies of the same query can be saved within a single snapshot, provided their input parameters are different.

FIG. 10B depicts screenshot 100b of one embodiment of user interface 50 showing Snapshot is selected as the Analysis Source for Project Alpha and main_hub_Bucket3-10-08 is selected from Available Snapshots. In this example, Member type PERSON 74 and Entity Type id 84 are selected for analysis. Once the Analytics view has a data source associated with it, the user can load one or more queries and view the results. Each query displays a specialized set of data. In some embodiments, available queries are categorized into Data Analysis, Entity Analysis, Bucket Analysis and Linkage Analysis types.

Figure 11:
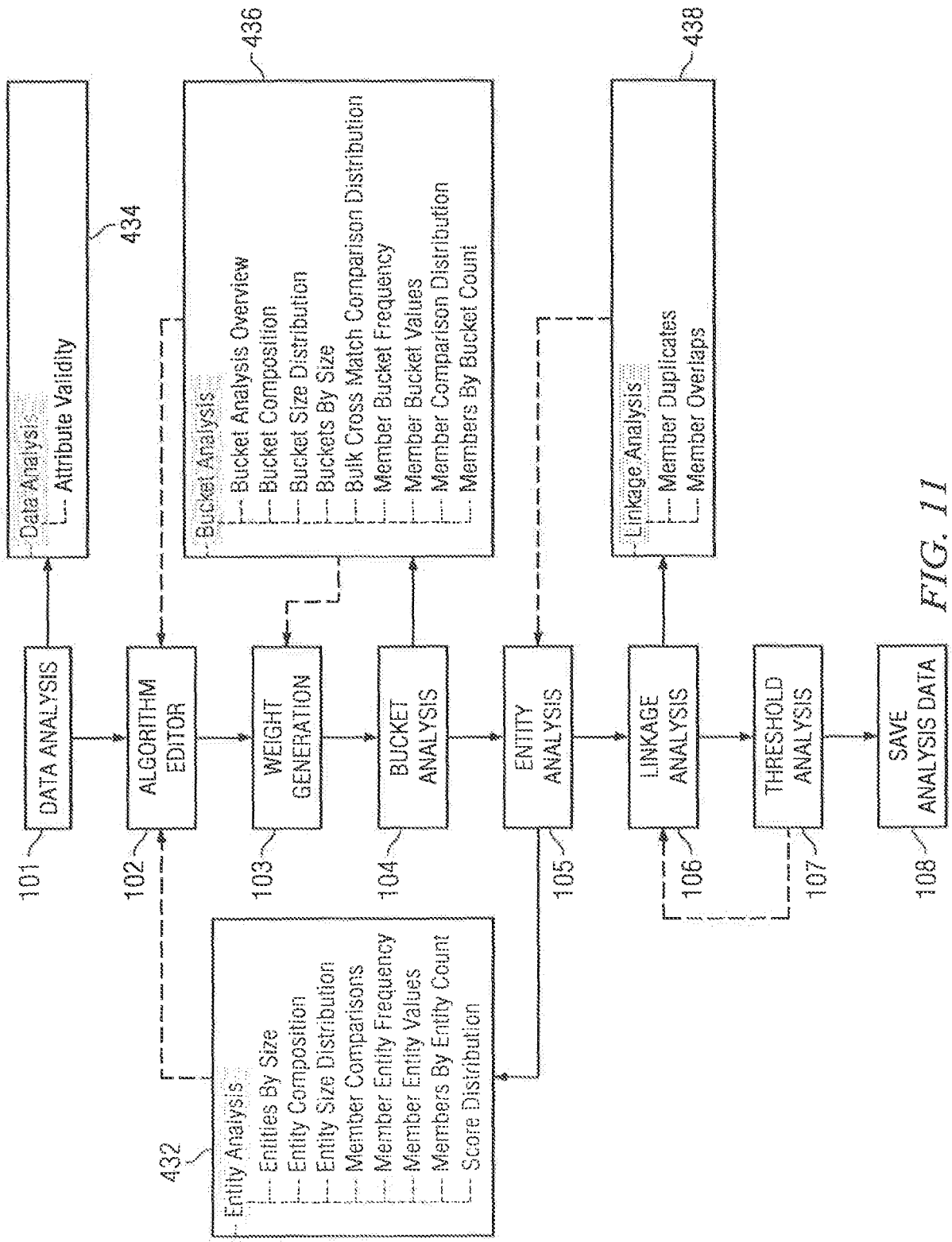
FIG. 11 depicts a flow diagram of one embodiment of a method for analyzing a configuration of an identity hub.

FIG. 11 depicts a flow diagram of one embodiment of a method for analyzing a configuration of an identity hub. As mentioned above, tools in embodiments of Workbench 20 are integrated such that they can assist a user in seamlessly configuring an instance of Identity Hub 32 and validating the correctness of the configuration in real time. Therefore, the method steps illustrated in FIG. 11 are meant to illustrate an example process and not to be construed as limiting in any way. For example, once member pairs have been sampled, comparison data and bucketing data (derived data) have been created, weights have been established, and appropriate AL and CR thresholds have been determined, one can run some early analyses on the buckets such as bucket size and bucket distribution. Such early analyses may help identifying identify data abnormalities at an early stage. Thus, not all steps in FIG. 11 are necessary and some embodiments of a method for analyzing a system for matching records may comprise one or more steps in FIG. 11. Furthermore, steps in FIG. 11 may be executed in no particular order. For example, as part of the weight generation process (step 103), a set of suggested thresholds (candidate thresholds) may be generated. At this point, a user can run Threshold Analysis (step 107) and view estimated false positive and false negative rates for a range of threshold values. After the thresholds have been set and a (potentially final) cross-match has been completed, the user may review entities (step 105) for possible errors (missing anon values, etc.). If Hub is selected as the Analysis source, the user can, via Entity Analysis tool 432 from Workbench 20, see the distribution of entity sizes and drill down and view data from members in suspect entities to help identify errors. A report of entity sizes can be saved to disk (e.g., computer readable storage medium 56) for comparison after further tuning has been performed.

These above-described analysis tasks can be completed near the end of the project or while other parts of the process are still being done. For example, in some cases, configuration tasks such as configuring the applications, setting up users/groups, creating composite views, etc. may still need to be completed through Configuration Editor 410 in Workbench 20. After making the necessary changes, they need to be deployed to the running server like all other configuration data. At the end of the project, a report on the configuration can be generated that can be used at a later time to verify the system's health and determine any tuning efforts that may need to be taken to return the system to optimal performance. Moreover, once a configuration has been finished, it can easily be redeployed to other servers (test, production, etc.). After deploying the configuration to a new server, a user at computer 40 can run the task "Generate All Configuration Data" to create the derived data and run all necessary comparison and linking processes on the new server.

Referring back to FIG. 11, as an example, one embodiment of a method for analyzing an identity hub may comprise analyzing validity of attributes of a set of data records through Data Analysis tool 434 (step 101). In one embodiment, a method for analyzing an identity hub may comprise analyzing entities through Entity Analysis tool 432 (step 105). In one embodiment, these entities are categorized as having a particular entity type in Identity Hub 32. In some embodiments, analyzing those entities may entail analyzing an entity size distribution, analyzing those entities by size, analyzing those entities by composition, analyzing a score distribution associated with those entities, analyzing member comparisons associated with those entities, or a combination thereof. In some embodiments, after analyzing entities, a user may wish to run Algorithm Editor 420 and modify an algorithm associated with the entity type and/or change one or more parameter values in one or more algorithm components as described above (step 102). In some embodiments, such a modification or change may trigger a change to a bucketing strategy and new weights may be automatically generated via weight generation (step 103). Thus, the user may wish to run Bucket Analysis tool 436 to review and analyze buckets and statistics associated therewith (step 104). In some embodiments, through Bucket Analysis tool 436 from Workbench 20, the user can analyze a bucket size distribution, analyze those buckets by size, analyze those buckets by composition, analyze a bulk cross match comparison distribution, analyze members (records) by bucket count, analyze member bucket values, analyze member bucket frequencies, analyze a member comparison distribution, or a combination thereof. In some embodiments, the user may run Linkage Analysis tool 438 to analyze member duplicates and member overlaps (step 106) with respect to CR and AL thresholds currently in use (step 107). During or after any of the above steps, analysis data may be saved (step 108).

Figure 12A:
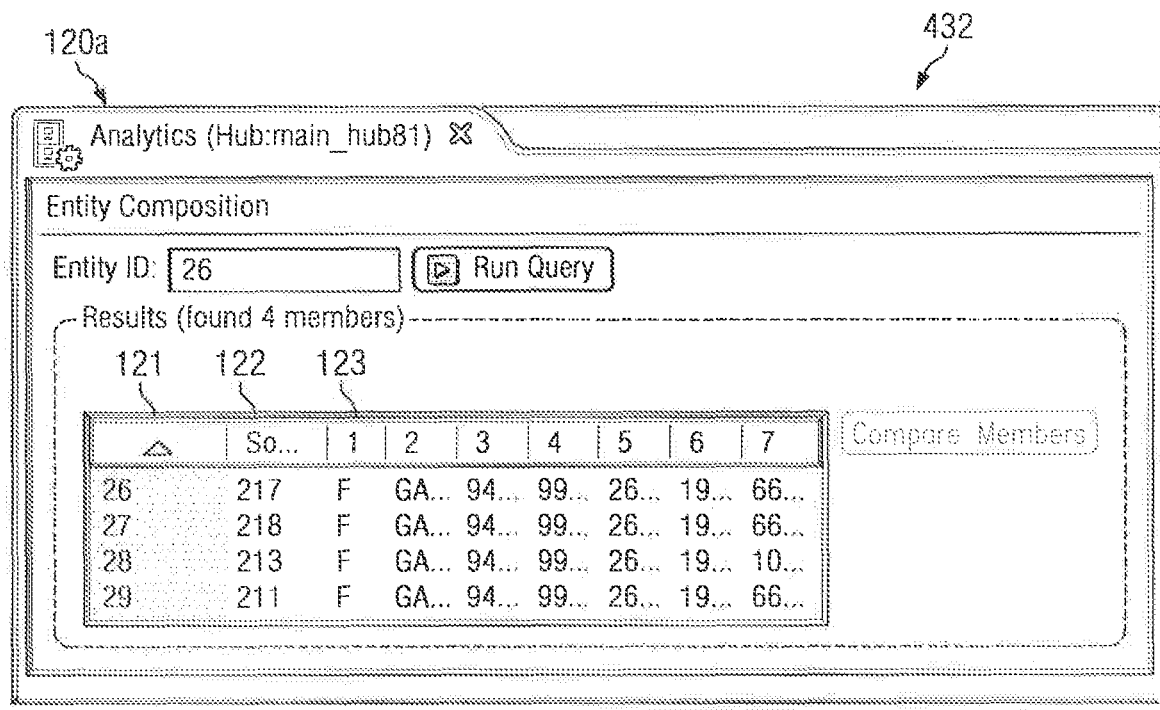
FIGS. 12A and 12B depict screenshots of one embodiment of an entity analysis tool.
Figure 12B:
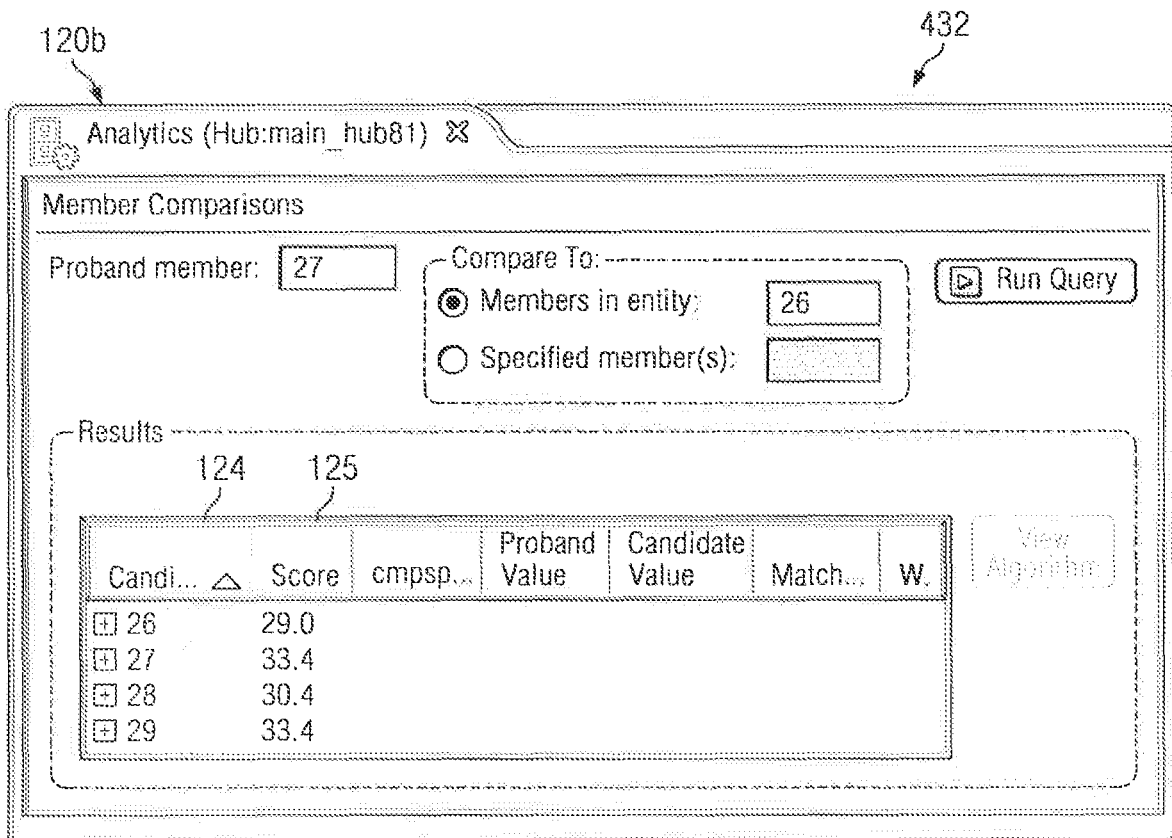

FIGS. 12A and 12B depict screenshots 120a and 120b of one embodiment of Entity Analysis tool 432. Specifically, screenshot 120a of FIG. 12A depicts the results of an Entity Composition query, where column 121 lists four members found (i.e., Entity 26 has four candidate data records linked together), column 122 lists the values of a particular attribute (Social Security number) associated with those members, column 123 lists the values of another particular attribute (Gender) associated with those members, and so on. Screenshot 120b of FIG. 12B depicts the results of a Member Comparisons query, comparing Proband member 27 with Members in Entity 26, where column 124 lists the candidate records compared and column 125 lists their corresponding scores.

The Entity Composition query and the Member Comparisons query shown in FIGS. 12A and 12B are examples of queries available through Entity Analysis tool 432. In some embodiments, queries available through Entity Analysis tool 43 may comprise Entities By Size, Entity Composition, Entity Size Distribution, Member Comparisons, Member Entity Frequency, Member Entity Values, Members By entity Count, and Score Distribution.

Entitles by Size

This query provides the ability to query for entities that match a specified range of sizes (number of members in an entity). Specifying a value of 0 for either the minimum or maximum size indicates that there is no limit (no minimum or no maximum).

Entity Composition

This query shows the content of a specified entity. As FIG. 12A exemplifies, the resulting table lists the member record IDs and source IDs that are in the specified entity as well as the comparison data for each member. The comparison data can be spilt out by comparison role into individual columns of the table.

Entity Size Distribution

This query provides a comprehensive view of all the entities in the Hub as they relate to size. The view may be filtered to show entities from the checked sources only. If an entity is comprised of members in a checked source(s) as well as an unchecked source(s), then the size shown for the entity will be a count of the member records in the checked sources only.

Member Comparisons

This query provides a mechanism to compare a member record against all the members in a specified entity (see FIG. 12B) or to a set of specified members.

Member Entity Frequency

This query shows the frequency in which members appear in entities; that is, the number of members who are in one entity, the number who are in two entities, the number who are in three entities, and so on.

Member Entity Values

This query shows the entities to which a member belongs.

Members by Entity Count

This query shows a list of members who are in a specified range of entities (for example, all members who are in 3 or more entities). If no maximum number is specified, a value of 0 is shown in a Maximum Number of Entities field. Otherwise, the maximum number of entitles value must be greater than or equal to that in the minimum number of entities.

Score Distribution

This query shows the distribution of scores for all the record pairs in the system. In some embodiments, single member entities or entities with more than two member records may not be included in the results. In some embodiments, the number of pairs for each score may be the sum of all counts in a given score range. For example, an x axis score value of 27 may represent all pairs that score between 26.1 and 27.0. The view may be filtered to show entities from the checked sources only. If an entity is comprised of members in a checked source(s) as well as an unchecked source(s), then the size shown for the entity will be a count of the member records in the checked sources only. If no results show for a particular linkage type, there may not be any entitles meeting the criteria for that linkage type and/or set of selected sources.

Figure 13:
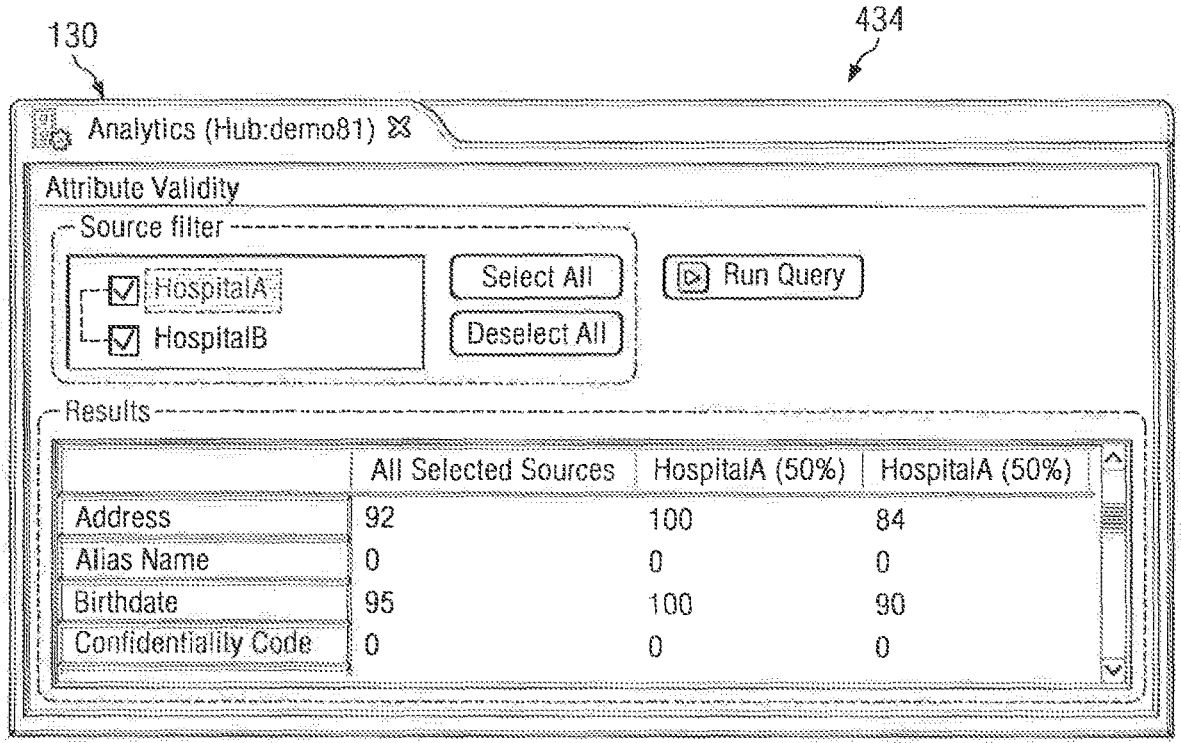
FIG. 13 depicts a screenshot of one embodiment of a data analysis tool.

FIG. 13 depicts screenshot 130 of one embodiment of Data Analysis tool 434. In one embodiment, Data Analysis tool 434 may provide an Attribute Validity query as shown in FIG. 13.

Attribute Validity

This query shows the percentage of time the records from all sources and from individual sources have values for the member types attributes. Values that are present in high percentages should be considered as potential candidates for use in algorithms. In some embodiments, by default, the results may be sorted by attribute name. In some embodiments, the results may be sorted by column. In some embodiments, sources may be filtered so that the resulting table may list the percent of the member type's records that are contained in a specified source.

Figure 14:
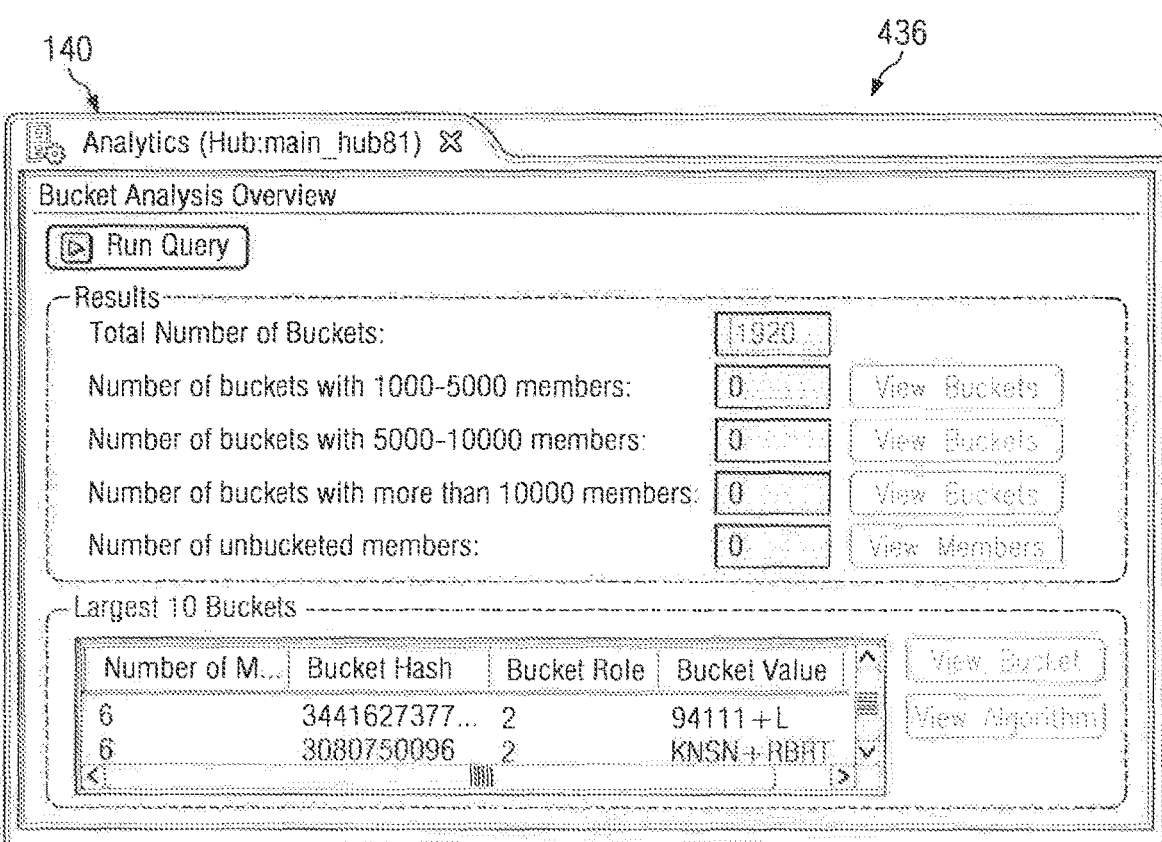
FIG. 14 depicts a screenshot of one embodiment of a bucket analysis tool.

FIG. 14 depicts screenshot 140 of one embodiment of Bucket Analysis tool 438. In some embodiments, if the number of records in the Hub is larger than 2 million, the bucket analysis queries will not execute unless the data is first prepared. In some embodiments, data preparation may involve taking the raw member and bucket data and pre-computing an intermediary set of data that can be quickly queried. This data preparation can be done through the "Bucket Analysis Preparation" job via Configuration Editor 410. In some cases, preparing data for 2-5 million records may take around 10 minutes, while preparing data for 50 million records may take around 5 hours. These estimates may vary wildly depending on different hardware and database configurations. If the member data is modified, then the prepared data should be recomputed as well to avoid seeing out-of-date results.

Screenshot 140 depicts the results of a Bucket Analysis Overview query, which is one of a plurality of queries available through Bucket Analysis tool 436. In some embodiments, queries available through Bucket Analysis tool 436 may comprise Bucket Analysis Overview, Bucket Composition, Bucket Size Distribution, Buckets By Size, Bulk Cross Match Comparison Distribution, Member Bucket Frequency, Member Bucket Values, Member Comparison Distribution, and Members By Bucket Count.

Bucket Analysis Overview

This query provides some general information on the health of the Hub's bucketing strategy. As exemplified in FIG. 14, in one embodiment, the top half of the view may be filled with information such as number of large buckets, unbucketed members, etc. A particular range of large buckets and/or unbucketed members can be viewed by clicking an appropriate button. More specifically, clicking on a View Buckets button will select the Buckets By Size view and run a query with the desired range of bucket sizes. Clicking on a View Members button will select the Members By Bucket Count view and run a query to show members without any buckets. In this example, the bottom area of the view depicted in FIG. 14 shows the ten largest buckets along with those buckets' hash values, the bucket role that generated the bucket, as well as a bucket value from one of the members in those buckets. The bucket value may be identical for all members in the same bucket. Selecting a bucket hash and clicking on the View Bucket button will run the Bucket Composition query and populate the view with the select bucket's members and those member's bucket values for that hash code.

Bucket Composition

This query shows the content of a specified bucket. The resulting table lists the memrecnos that are in the specified bucket as well as the bucket role and bucket value for each member in that bucket. The bucket values shown are the actual bucket values freshly calculated from the member data in the database. If different bucket values show up for the same bucket hash then that would indicate a bucket hash collision. This would be considered an anomaly and might explain why certain members are being compared against each other which normally would not compare against each other. However, such a condition is not in general considered hazardous to the system's health. In some embodiments, the view for this query may include a View Member button and a View Algorithm button such that selecting a row in the resulting table and clicking the View Member button will run the Member Bucket Values query to show all of the selected member's buckets and clicking the View Algorithm button will open Algorithm Editor 420 and select the bucket role that created the specified bucket (see FIG. 9A).

Bucket Size Distribution

This query provides a comprehensive view of all the buckets in the Hub as they relate to size. In some embodiments, large buckets are shown to the right side of the view and are indicated by a color indicator that goes from green (smaller buckets) to yellow (medium sized buckets) to red (large buckets). The data points in a graph plotting a bucket size distribution may follow a downward curve from the left (smaller buckets) to the right (larger buckets). Thus, extensive data points on the right side of the bucket size distribution graph may be areas of concern and could indicate missed anonymous values, incorrect thresholds, data problems, etc. In some embodiments, clicking on a data point will select the Buckets By Size view and will run a query to show those buckets of that size. In some embodiments, by pressing the control key before clicking on the data point and query may show those buckets of that size and larger.

Buckets by Size

This query provides the ability to query for buckets that match a specified range of sizes (number of members in a bucket). For example, specifying a value of 0 for either the minimum or maximum size indicates that there is no limit (no minimum or no maximum). In some embodiments, the resulting table may show the member count, the bucket hash, bucket role, and a sample bucket value from one of the members in the bucket. Again, the bucket value may be the same for all members in any given bucket. One exception to this is if there was a hash collision that resulted in different bucket values having the same bucket hash. To check this condition, a user can select the bucket and click a View Bucket button to view an of the members and their bucket values for any given bucket. If it is determined that a problem exists with a particular bucket role (lack of frequency based bucketing, etc.), Algorithm Editor 420 can be opened by selecting a table row and clicking a View Algorithm button. This will bring up Algorithm Editor 420 and select the particular bucket role that created the selected bucket (see FIG. 9A).

Bulk Cross Match Comparison Distribution

This query calculates the number of comparisons required for a bulk cross match as it relates to the maximum bucket set size parameter (Bucket Size Limit) that is specified on an mpxcomp job. This number of comparisons can then be used together with the number of threads and number of comparisons per thread per second to determine the approximate completion time for a bulk cross match.

Member Bucket Frequency

This view answers the question "How many members are in 1 bucket, 2 buckets, 3 buckets, etc." in the form of a bar chart or the like. An x-axis data point of 0 shows the number of un-bucketed members. In some embodiments, clicking on a bar in the chart will select the Members By Bucket Count view and run a query to show those members with that many buckets.

Member Bucket Values

This view shows what buckets a specified member is in. The result table shows the bucket hash, bucket value, and the bucket role that produced each bucket. In some embodiments, selecting a bucket and clicking a View Bucket button selects the Bucket Composition view and runs a query to show the bucket composition for the selected bucket hash. Clicking on a View Algorithm button opens Algorithm Editor 420 and selects the bucket role that was responsible for creating that bucket (see FIG. 9A).

Member Comparison Distribution

This view shows estimated performance of the system as it relates to the number of comparisons being performed. That is to say: when a search is performed, how many actual comparisons will be made? As an example, a Member Comparison Distribution chart may indicate that, on average, three comparisons are made. More specifically, in some embodiments, 1 in 10 comparisons would result in approximately 6 comparison, 1 in 100 would be 7.5, and 1 in 1000 comparisons would result in about 8 comparisons. This data is based on 20,000 randomly sampled members from the system. If there are less than 20,000 members in the system, all members are used. On average, a target member will be compared against all members that share buckets with that target member.

Members by Bucket Count

This view provides a query for members based upon the number of buckets a member is contained in. In some embodiments, specifying a minimum and maximum of 0 will return all unbucketed members. For a minimum of greeter than 0, a maximum of 0 indicates no limit. In some embodiments, the resulting table shows the memrecno, the number of buckets the member is in, as well as the cmpd string for that member. In some embodiments, selecting a member and clicking a View Member button selects the Member Bucket Values view to show all buckets that the member appears in.

Figure 15:
FIG. 15 depicts a screenshot of one embodiment of a linkage analysis tool.

FIG. 15 depicts screenshot 150 of one embodiment of Linkage Analysis tool 438. In some embodiments, Linkage Analysis tool 438 may provide a Member Duplicates query and a Member Overlaps query.

Member Duplicates

This query shows the various error rates around duplicate members (member records from the same source that link to the same entity). As exemplified in FIG. 15, in one embodiment, the first four columns of a resulting table may show the raw data from the Hub database (broken down by source): number of members, number of entitles, number of duplicate sets, and the number of members in those duplicate sets. The last 3 columns may list the various error rates that can be calculated from those values:

Record Error Rate—Indicates how many records you have to look at to resolve your duplicates, or how many records have an incomplete view of a member.

Entity Duplication Rate—Indicates how many members have duplicate records, or the probability that a random member has a duplicate record.

Record Duplication Rate—Indicates how many records are duplicates, or perhaps the percentage of records that could be eliminated.

Member Overlaps

This query provides information on the number of overlaps in the hub. An overlap may exist when an entity has records from multiple sources. For example, if an entity with three records exists, and each record is in a separate source system, then each source would be said to have two overlaps in it (A with B, A with C, et cetera). In some embodiments, a resulting table may show the number of unique entitles represented in a specified source as well as the percentage of all entitles that are represented by a record in that source. In some embodiments, the resulting table may also show the count and percent of those entities that have overlaps in at least one other source (those entities have at least one record in another source). Entities with overlaps in multiple other sources may only be counted once in the resulting table. In some embodiments, the resulting table may also show each source by source combination. For example, when the row and column source is the same, the percent of the count is 100%. However, when the row and column sources are unique, the count represents the number of overlaps that exist between the row source system and the column source system. The percent value thus represents the percent of entities in the row source that have overlaps in the column source.

Thus, in one embodiment, a method for analyzing an identity hub may comprise analyzing error rates associated with a set of data records. In one embodiment, the error rates may comprise record error and person error rates. In one embodiment, the record error rate for duplicates is the number of records who are involved in duplicate sets divided by the total number of records. It represents the chance of picking a fragmented record drawing at random from the file. In one embodiment, the person error rate is the number of unique individual who have multiple records divided by the total number of individuals represented in the file. Take a simple case of 5 records, A, B, C, D, and E where A, B, and C all represent the same person. Then the record error rate is 3/5 and the person error rate is 1/3 (the file represents 3 distinct people A-B-C, D, and E and one of them has multiple records.)

Figure 16:
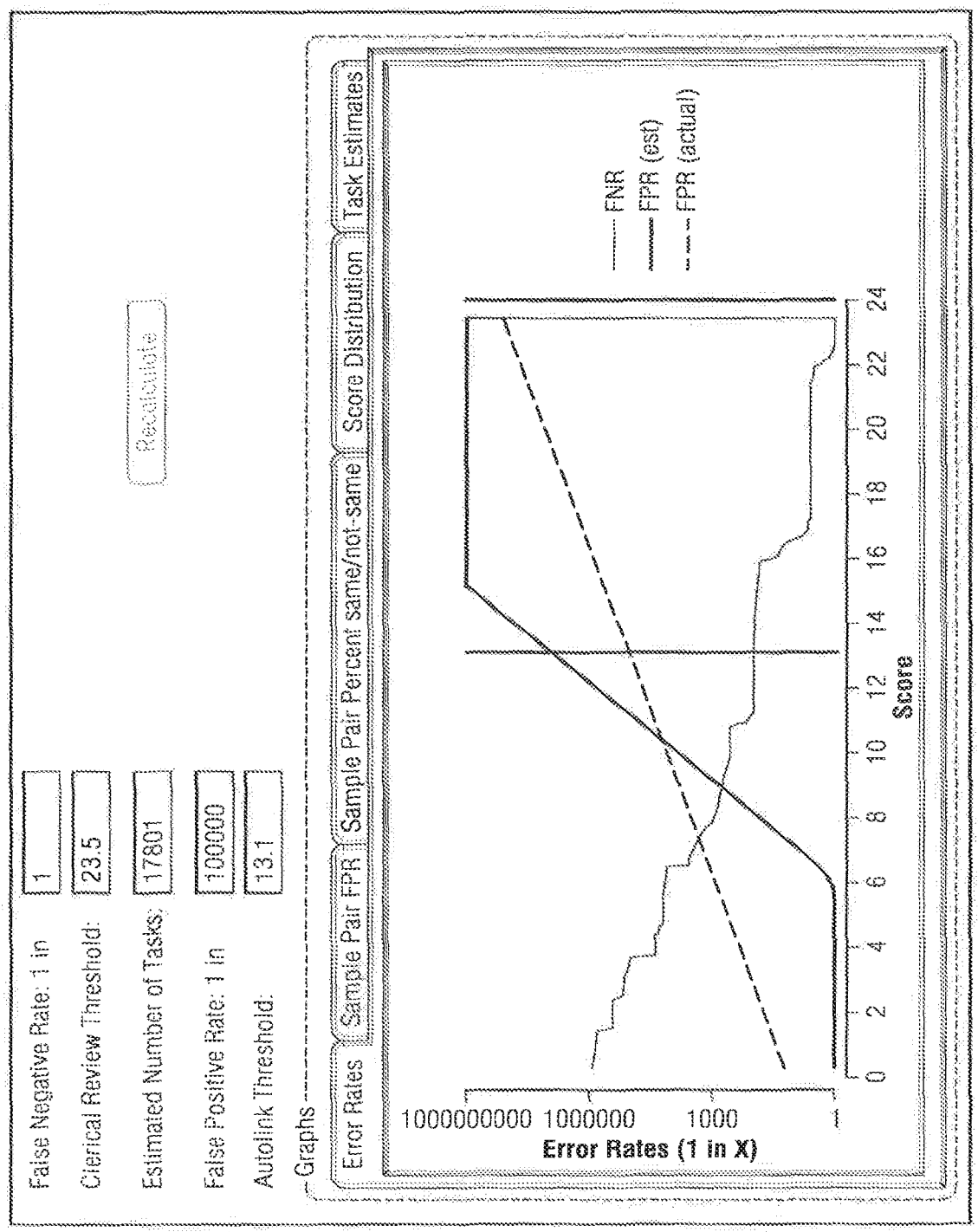
FIG. 16 depicts a screenshot of one embodiment of a graphical user interface through which error rates and thresholds associated with member records in an identity hub are analyzable.

In one embodiment, the error rates may comprise false positive and false negative rates. In one embodiment, the error rates are associated with clerical review (CR) and autolink (AL) thresholds. In one embodiment, the CR and AL thresholds are indicative of tolerance of Identity Hub 32 to false positive and false negative rates in matching a set of data records. Accordingly, one embodiment of a method for analyzing an identity hub may comprise analyzing the clerical review threshold and the autolink threshold. FIG. 16 depicts a screenshot of one embodiment of a graphical user interface through which error rates and thresholds associated with member records in an identity hub are analyzable.

One approach to estimate the thresholds involves scoring a sample of linkages produced by the bulk cross-match process, fitting the results of the scoring to a model curve for hit-rate, and using the resultant curve to pick thresholds based upon desired error rates. There are some underlying difficulties with this approach. First, it requires one to review and score a couple of thousand linked pairs across a wide range of scores. This introduces unavoidable variation due to individual interpretations of match or not-match. Second, hit-rate combines both inherent duplication rate in the data and the file size (if the data sample we used had no duplicates, then the hit-rate would be zero for all scores). Third, this process produces thresholds which apply to the cross-match and which need to be translated into search or query error rates.

In some embodiments, a new threshold estimation procedure described below can address these concerns. One advantage of this new approach is that it can be applied initially based upon the data profile or based upon a new set of statistics which will be produced during automatic weight generation.

False-Positive Rate (Auto-Link Threshold)

One advantage to using likelihood ratio for scoring is that there is a theoretical expression which can be used to approximate the statistical false-positive rate for a fixed threshold. This also means that, done properly, the probability of a match being a false match depends only upon the score and not on the actual data.

Represent the results of comparing two records by the vector x. Then the likelihood ratio, or score, for this comparison is given by $$\lambda(x) = \frac{f_M(x)}{f_U(x)}.$$

Here, $f_M(x)$ is the probability density for this comparison under the hypothesis that the records refer to the same object (person, business, etc.). That is, it is the probability of observing this outcome if we know that records should be matched. Similarly, $f_U(x)$ is the probability density for observing this outcome when the records do not refer to the same object (i.e., it is the probability of this set of comparisons occurring at random).

In some embodiments, the Hub can link two records when the logarithm of this score is greater than some threshold, so the false-positive probability is the probability that a comparison scores above the threshold when the records do not refer to the same object. Mathematically, this is $$P_U(\log(\lambda(x)) > T) = \int_{\{x:\ \log(\lambda(x)) > T\}} f_U(x).$$

Now, on the set $$\{x:\ \log(\lambda(x)) > T\},$$

$$10^T < \frac{f_M(x)}{f_U(x)}$$

So $f_U(s) < 10^{-T} f_M(x)$.

Thus, the probability of a false positive, on a single compare, is bounded by $$P_U(\log(\lambda(x)) > T) = \int_{\{x:\ \log(\lambda(x)) > T\}} f_U(x) < \int_{\{x:\ \log(\lambda(x)) > T\}} 10^{-T}\ f_M(x). < 10^{-T}$$

If the threshold is relatively large, one can think of a single search of a database containing n records as performing n separate comparisons. This means that the probability of a single search of the database returning a false-positive above the threshold is the same as the probability that the maximum of n independent single comparisons is above the threshold. Let $\{s_1, s_2, \ldots, s_n\}$ represent the score of a single record against all records in the database, then the probability of the search creating a false-positive can be expressed as $$Pfp = 1 - P(s_1 < T, s_2 < T, \ldots s_n < T)$$

$$= 1 - \prod_n P(s_1 < T)$$

$$= 1 - P(\log(\lambda(x)) < T)^n < 1 - (1 - 10^{-T})^n$$

$$\approx 1 - e^{-n10^{-T}}$$

for large T. This can be further simplified as $$Pfp \approx 1 - e^{-n10^{-T}} \approx n10^{-T}$$

where $10^T$ is large relative to n.

As an example, if a threshold of 11 is used against a database with a million records, then $$Pfp \approx 1000000 \times 10^{-11} \approx 10^{-5}$$

or about 1 in 100,000 searches.

Refining Autolink Threshold Based Upon Scored Sample Pairs

Once the sample pairs (assuming the sampling is uniform) have been scored, a new autolink (AL) threshold can be calculated. The information necessary for this may include:

- A file containing the scored pairs. The file may contain a score for each pair and an indicator of whether the two records in the pair may represent the same person (SP), do not represent the same person (NSP), of if there is not enough information to make a determination (NEI). A value may be assigned from the scoring procedure correspondingly. For example, 1 means SP, 0 means NSP, and −1 means NEI.
- Counts by score of the total number of pairs generated by the BXM (if the sources were filtered when the random pairs were generated, then this is the count of pairs where both members are in the filtered sources).
- Number of records in the database ((if the sources were filtered when the random pairs were generated, then this is the count of the records in those sources).

In some embodiments, the first step is to take the uniform sample and get a percentage plot by score for the NSPs and SPs. Only the NSPs are needed for updating the AL threshold. The next step is to get the total number of pairs by score. This can be generated in the step which created the sample pairs before manual evaluation. The next step is to calculate the probability of getting a false-positive as a function of score. For this, one needs to know the size of the database in order to normalize between the bulk cross-match rate and the query rate. For each score bin, take the probability of an NSP, multiply by the total number of pairs at that score, divide by the size of the database minus 1, and multiply the whole thing by 2. If the resulting distribution is not smooth, a linear exponential function can be applied to the sample data. That is, find coefficients a and b so that the function $p = e^{a+b \cdot s}$ is a least-squares fit to the sample data, where s is the score.

From the fit coefficients, the new AL threshold can be calculated as $$AL = \ln(-fprate \cdot b/(0.1 \cdot \text{Exp}(a)))/b.$$

The false-positive rate can be determined as a function of score using the formula $$fprate = -\frac{0.1}{b} \text{Exp}(a + b \cdot s).$$

Updating the Clerical Review Threshold

Figure 17:
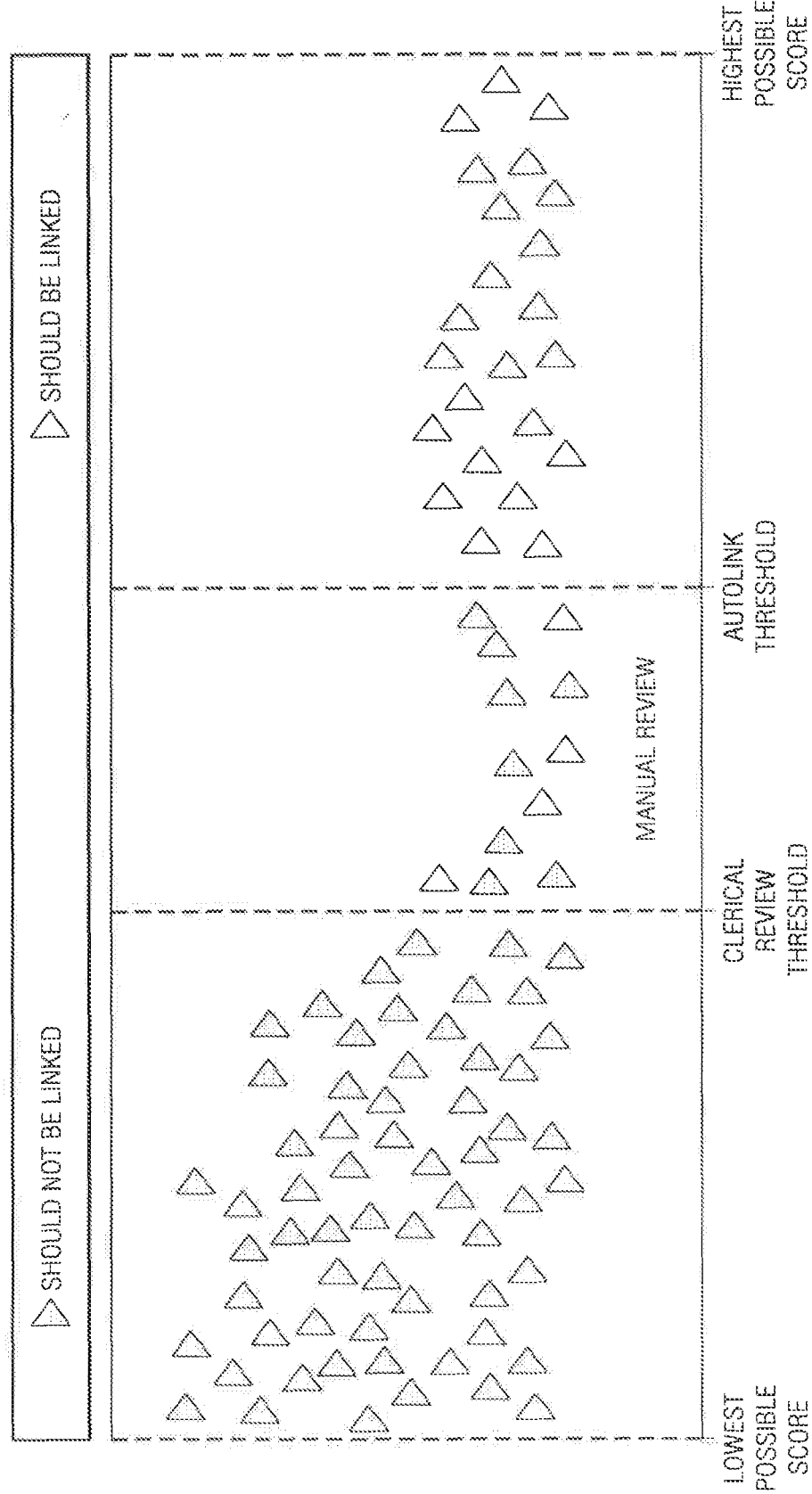
FIG. 17 illustrates a relationship between system performance and tolerance to false positive and false negative rates associated with linking member records in an identity hub.

Once an appropriate auto-link threshold is determined, an estimate of the number tasks can be determined as a function of the clerical review (CR) threshold. This can be obtained from the pair counts by score, by summing to the auto-link. The user may adjust the CR threshold to yield a fixed number of tasks. FIG. 17 illustrates a relationship between system performance and tolerance to false positive and false negative rates associated with linking member records in an identity hub. In the example of FIG. 17, the AL and CR thresholds yield 12 clerical review tasks.

In the foregoing specification, the disclosure has been described with reference to specific embodiments. However, it should be understood that the description is by way of example only and is not to be construed in a limiting sense. It is to be further understood, therefore, that numerous changes in the details of the embodiments of this disclosure and additional embodiments of this disclosure will be apparent to, and may be made by, persons of ordinary skill in the art having reference to this description. It is contemplated that all such changes and additional embodiments are within the scope of the disclosure as detailed in the following claims.

What is claimed is:

1. A computer-implemented method for analyzing a system for matching data records, the method comprising:
    producing a configuration of said system for matching data records, the configuration of the system including a bucketing strategy employing matching functions and matching parameters to create buckets containing data records, wherein said buckets are created by comparing sets of one or more attributes of initial data records with corresponding attributes of candidate data records in said system, wherein each bucket is associated with a corresponding set of attributes, and wherein data records associated with a same entity are determined and linked by comparing one or more attributes of the initial data records to corresponding attributes of the candidate data records within the buckets in accordance with the matching functions and matching parameters;
    applying said configuration to said system and analyzing buckets created during operation of said system according to the bucketing strategy associated with said configuration of said system;
    analyzing an effect of said buckets on throughput of said system via a bucket analysis tool providing a user interface, wherein analyzing an effect of said buckets further comprises:
        executing one or more queries from the user interface of the bucket analysis tool to produce characteristics associated with the buckets created during operation of the system, wherein the characteristics include distribution of data within the created buckets and data records not placed in the created buckets; and identifying performance issues of the system from the characteristics of the created buckets produced from the one or more queries; and modifying said configuration during operation of said system to adjust distribution of the data records within said buckets in real time to address the identified performance issues and enable the throughput of said system to reside within a predetermined desired range, wherein modifying said configuration includes:

changing said matching functions and matching parameters of said bucketing strategy for creating said buckets based on said identified performance issues to alter the comparing of said attributes and determination of the association of data records with the same entity for said buckets, wherein changing said matching functions and matching parameters includes providing a different combination of attributes for the corresponding set of attributes for at least one bucket.

2. The method of claim 1, wherein said changing said matching functions and matching parameters of said bucketing strategy further comprises editing an algorithm utilized in creating said buckets or changing one or more parameter values associated with said algorithm.

3. The method of claim 1, wherein said modifying said configuration further comprises:

estimating performance of said system with said modified configuration under a real time load via the bucket analysis tool to ensure the throughput of said system resides within said predetermined desired range.

4. The method of claim 2, wherein said algorithm is associated with an entity type, and said method further comprises analyzing entities categorized as having said entity type in said system.

5. The method of claim 4, wherein said analyzing said entities further comprises one or more from a group of analyzing an entity size distribution, analyzing said entities by size, analyzing said entities by composition, analyzing a score distribution associated with said entities, and analyzing member comparisons associated with said entities.

6. The method of claim 1, further comprising analyzing validity of attributes of said initial data records.

7. The method of claim 1, wherein said analyzing said buckets further comprises one or more from a group of analyzing statistics associated with said buckets, analyzing a bucket size distribution, analyzing said buckets by size, analyzing said buckets by composition, analyzing a bulk cross match comparison distribution, analyzing members by bucket count, analyzing member bucket values, analyzing member bucket frequencies, and analyzing a member comparison distribution.

8. The method of claim 1, further comprising analyzing error rates associated with said initial data records, wherein said error rates comprise a record error rate and a person error rate.

9. The method of claim 1, wherein said configuration of said system comprises a clerical review threshold and an autolink threshold, and wherein said clerical review threshold and said autolink threshold are indicative of tolerance of said system to false positive and false negative rates in matching said initial data records, further comprising analyzing said clerical review threshold and said autolink threshold.

10. A system for analyzing an identity system for matching data records, the system comprising:

at least one processor with logic to:

produce a configuration of said identity system for matching data records, the configuration of the identity system including a bucketing strategy employing matching functions and matching parameters to create buckets containing data records, wherein said buckets are created by comparing sets of one or more attributes of initial data records with corresponding attributes of candidate data records in said identity system, wherein each bucket is associated with a corresponding set of attributes, and wherein data records associated with a same entity are determined and linked by comparing one or more attributes of the initial data records to corresponding attributes of the candidate data records within the buckets in accordance with the matching functions and matching parameters;

apply said configuration to said identity system and analyze buckets created during operation of said identity system according to the bucketing strategy associated with said configuration of said identity system;

analyze an effect of said buckets on throughput of said identity system via a bucket analysis tool providing a user interface, wherein analyzing an effect of said buckets further comprises:

executing one or more queries from the user interface of the bucket analysis tool to produce characteristics associated with the buckets created during operation of the identity system, wherein the characteristics include distribution of data within the created buckets and data records not placed in the created buckets; and identifying performance issues of the identity system from the characteristics of the created buckets produced from the one or more queries; and modify said configuration during operation of said identity system to adjust distribution of the data records within said buckets in real time to address the identified performance issues and enable the throughput of said identity system to reside within a predetermined desired range, wherein modifying said configuration includes:

changing said matching functions and matching parameters of said bucketing strategy for creating said buckets based on said identified performance issues to alter the comparing of said attributes and determination of the association of data records with the same entity for said buckets, wherein changing said matching functions and matching parameters includes providing a different combination of attributes for the corresponding set of attributes for at least one bucket.

11. The system of claim 10, wherein said at least one processor further displays an algorithm editor through which an algorithm utilized in creating said buckets is edited.

12. The system of claim 10, wherein said bucketing strategy is associated with an entity type, and wherein said at least one processor further displays an entity analysis tool through which entities categorized as having said entity type in said identity system are analyzed.

13. The system of claim 10, wherein said at least one processor further provides a plurality of functions through an entity analysis tool, wherein said plurality of functions enables analysis of one or more from a group of an entity size distribution, said entities by size, said entities by composition, a score distribution associated with said entities, and member comparisons associated with said entities.

14. The system of claim 10, wherein said at least one processor further displays a data analysis tool through which said initial data records are analyzed.

15. The system of claim 14, wherein said at least one processor further provides at least one function through said data analysis tool, wherein said at least one function enables analysis of attribute validity of said initial data records.

16. The system of claim 10, wherein said analyzing said buckets further comprises one or more from a group of analyzing statistics associated with said buckets, analyzing a bucket size distribution, analyzing said buckets by size, analyzing said buckets by composition, analyzing a bulk cross match comparison distribution, analyzing members by bucket count, analyzing member bucket values, analyzing member bucket frequencies, and analyzing a member comparison distribution.

17. The system of claim 10, wherein said at least one processor further displays a linkage analysis tool through which error rates associated with said initial data records are analyzed, wherein said error rates comprise a record error rate and a person error rate.

18. A non-transitory computer readable storage medium storing computer instructions executable by a processor for analyzing a system for matching data records, when executed by said processor, said computer instructions cause said processor to:
produce a configuration of said system for matching data records, the configuration of the system including a bucketing strategy employing matching functions and matching parameters to create buckets containing data records, wherein said buckets are created by comparing sets of one or more attributes of initial data records with corresponding attributes of candidate data records in said system, wherein each bucket is associated with a corresponding set of attributes, and wherein data records associated with a same entity are determined and linked by comparing one or more attributes of the initial data records to corresponding attributes of the candidate data records within the buckets in accordance with the matching functions and matching parameters;
apply said configuration to said system and analyze buckets created during operation of said system according to the bucketing strategy associated with said configuration of said system;
analyze an effect of said buckets on throughput of said system via a bucket analysis tool providing a user interface, wherein analyzing an effect of said buckets further comprises:
executing one or more queries from the user interface of the bucket analysis tool to produce characteristics associated with the buckets created during operation of the system, wherein the characteristics include distribution of data within the created buckets and data records not placed in the created buckets; and
identifying performance issues of the system from the characteristics of the created buckets produced from the one or more queries; and
modify said configuration during operation of said system to adjust distribution of the data records within said buckets in real time to address the identified performance issues and enable the throughput of said system to reside within a predetermined desired range, wherein modifying said configuration includes:
changing said matching functions and matching parameters of said bucketing strategy for creating said buckets based on said identified performance issues to alter the comparing of said attributes and determination of the association of data records with the same entity for said buckets, wherein changing said matching functions and matching parameters includes providing a different combination of attributes for the corresponding set of attributes for at least one bucket.

19. The non-transitory computer readable storage medium of claim 18, wherein said analyzing said buckets further comprises one or more from a group of analyzing statistics associated with said buckets, analyzing a bucket size distribution, analyzing said buckets by size, analyzing said buckets by composition, analyzing a bulk cross match comparison distribution, analyzing members by bucket count, analyzing member bucket values, analyzing member bucket frequencies, and analyzing a member comparison distribution.

* * * * *